United States Patent
Hurley

(10) Patent No.: US 10,273,368 B2
(45) Date of Patent: Apr. 30, 2019

(54) FLEXIBLE SUPERHYDROPHOBIC AND/OR OLEOPHOBIC POLYURETHANE COATINGS

(71) Applicant: Ross Technology Corporation, Leola, PA (US)

(72) Inventor: Michael F. Hurley, Lancaster, PA (US)

(73) Assignee: Ross Technology LLC, Leola, PA (US)

( * ) Notice: Subject to any disclaimer, the term of this patent is extended or adjusted under 35 U.S.C. 154(b) by 12 days.

(21) Appl. No.: 15/081,562

(22) Filed: Mar. 25, 2016

(65) Prior Publication Data

US 2016/0208111 A1   Jul. 21, 2016

Related U.S. Application Data

(63) Continuation of application No. PCT/US2014/057848, filed on Sep. 26, 2014.
(Continued)

(51) Int. Cl.

| C09D 5/16 | (2006.01) |
|---|---|
| C09D 175/06 | (2006.01) |
| B05D 7/00 | (2006.01) |
| B05D 1/00 | (2006.01) |
| B05D 1/02 | (2006.01) |
| B05D 1/04 | (2006.01) |
| B05D 1/18 | (2006.01) |
| B05D 1/28 | (2006.01) |
| C08G 18/78 | (2006.01) |
| C08G 18/42 | (2006.01) |
| B05D 5/08 | (2006.01) |
| B05D 1/36 | (2006.01) |
| C08G 18/79 | (2006.01) |

(Continued)

(52) U.S. Cl.
CPC ........... *C09D 5/1693* (2013.01); *B05D 1/005* (2013.01); *B05D 1/02* (2013.01); *B05D 1/04* (2013.01); *B05D 1/18* (2013.01); *B05D 1/28* (2013.01); *B05D 1/36* (2013.01); *B05D 5/08* (2013.01); *B05D 7/50* (2013.01); *C08G 18/42* (2013.01); *C08G 18/7831* (2013.01); *C08G 18/792* (2013.01); *C08K 7/16* (2013.01); *C09D 175/04* (2013.01); *C09D 175/06* (2013.01); *B05D 5/083* (2013.01)

(58) Field of Classification Search
CPC ...... C08K 7/16; C09D 175/04; C09D 175/06; C09D 5/1693; C08L 27/12; C08L 75/06; C08G 18/42; C08G 18/7831; C08G 18/792; B05D 1/005; B05D 1/02; B05D 1/04; B05D 1/18; B05D 1/28; B05D 1/36; B05D 5/08; B05D 5/083; B05D 7/50
USPC ...................... 428/423.1; 528/85; 427/376.2
See application file for complete search history.

(56) References Cited

U.S. PATENT DOCUMENTS

| 3,716,502 A | 2/1973 | Lowe |
|---|---|---|
| 5,952,053 A | 9/1999 | Colby |

(Continued)

OTHER PUBLICATIONS

Supplementary European Search Report, European Application No. 14 84 7194 (published as EP Publication No. EP 3 049 453), dated Apr. 21, 2017.

*Primary Examiner* — Thao T Tran
(74) *Attorney, Agent, or Firm* — Perkins Coie LLP

(57) ABSTRACT

This disclosure deals with novel formulations to create highly durable flexible hydrophobic, superhydrophobic, oleophobic and/or superoleophobic surfaces. The formulations of this invention can be applied by dip, spray and painting processes.

21 Claims, 1 Drawing Sheet

Related U.S. Application Data

(60) Provisional application No. 61/883,053, filed on Sep. 26, 2013.

(51) Int. Cl.
*C09D 175/04* (2006.01)
*C08K 7/16* (2006.01)

(56) References Cited

U.S. PATENT DOCUMENTS

| | | |
|---|---|---|
| 6,872,444 B2 * | 3/2005 | McDonald ........... B41M 5/0047 |
| | | 106/287.1 |
| 7,943,234 B2 | 5/2011 | Lawin et al. |
| 7,989,619 B2 | 8/2011 | Guire et al. |
| 8,158,106 B2 | 1/2012 | Guire et al. |
| 9,067,821 B2 | 6/2015 | Bleecher et al. |
| 9,139,744 B2 | 9/2015 | Sikka et al. |
| 9,279,073 B2 | 1/2016 | Bleecher et al. |
| 9,546,285 B2 | 1/2017 | Gebauer et al. |
| 9,546,299 B2 | 1/2017 | Gesford et al. |
| 9,914,849 B2 | 3/2018 | Bleecher et al. |
| 9,926,478 B2 | 3/2018 | Bleecher et al. |
| 2008/0008838 A1 | 1/2008 | Arpac et al. |
| 2009/0019647 A1 * | 1/2009 | Frazee ................ C09B 67/0069 |
| | | 8/553 |
| 2009/0240004 A1 | 9/2009 | Maier et al. |
| 2010/0047550 A1 * | 2/2010 | Prissok ................ C08G 18/10 |
| | | 428/313.5 |
| 2013/0139309 A1 | 6/2013 | Bleecher et al. |
| 2014/0205804 A1 * | 7/2014 | Jones .................. B65D 83/752 |
| | | 428/141 |

* cited by examiner

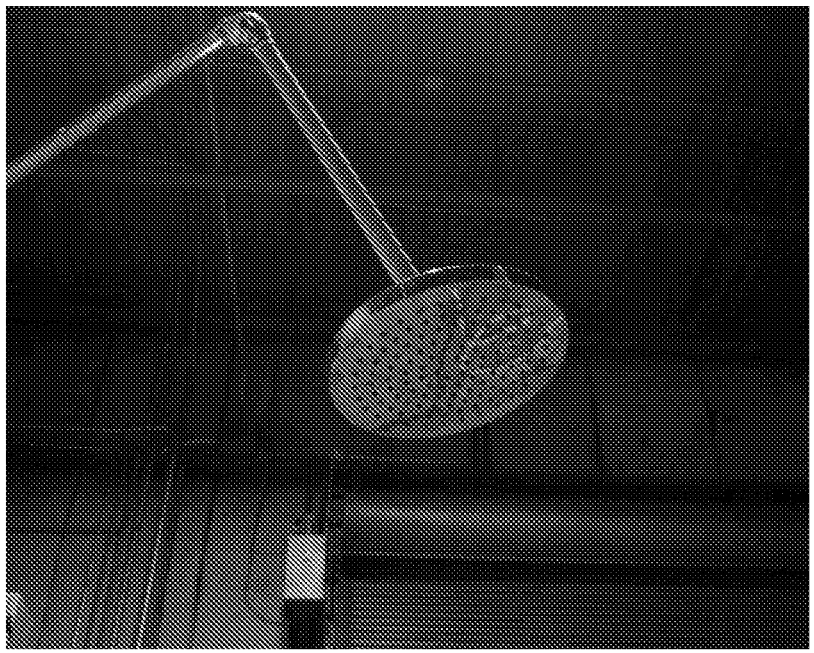
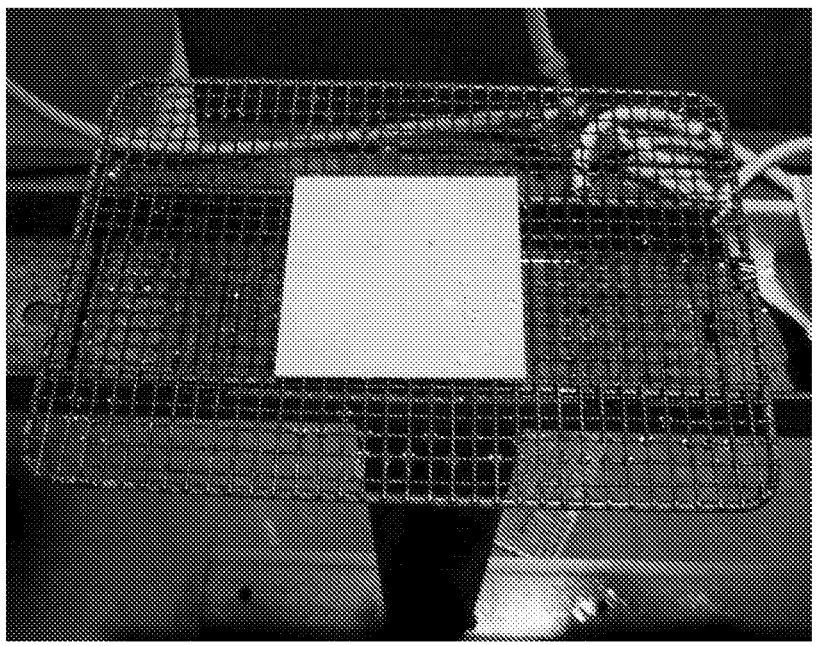

FLEXIBLE SUPERHYDROPHOBIC AND/OR OLEOPHOBIC POLYURETHANE COATINGS

CROSS-REFERENCE TO RELATED APPLICATIONS

This application is a continuation of International Application No. PCT/US2014/057848, filed Sep. 26, 2014, which claims the benefit of priority to U.S. Provisional Application No. 61/883,053, filed Sep. 26, 2013, the contents of each of which applications is incorporated herein by reference in its entirety.

BACKGROUND

Polyurethanes have a variety of characteristics that make them desirable for use in coating applications. Although they are resistant to the action of many naturally occurring and manmade agents, resistance to the action of chemical agents can be increased by rendering them hydrophobic and/or oleophobic, thereby limiting their exposure to those agents. The performance of articles coated with hydrophobic and/or oleophobic coatings exposed to a variety of chemical agents and conditions may also be improved. For example, freezing liquids, such as water, can result in frozen deposits tightly attached to the surfaces that prevent access to the surfaces, and in some instances prevent proper operation of equipment bound by the frozen liquid. The anti-icing effect of hydrophobic and oleophobic surfaces can prevent ice buildup.

SUMMARY

Embodiments of coatings and surface treatments are provided herein that can provide advantageous surface properties including, but not limited to, hydrophobicity or superhydrophobicity (collectively HP), oleophobicity or superoleophobicity (collectively OP), and resistance to ice formation, adherence and/or accumulation. Embodiments of the coatings described herein that are HP and OP, and which may also display anti-icing behavior, may be applied to a surface using two or more steps. Embodiments of methods of applying such coatings and surface treatments also are provided, together with embodiments of compositions for applying such coatings and surface treatments, and surfaces and/or objects so treated and coated are provided as well.

Embodiments of this disclosure set forth coating compositions that employ solvent based binder systems that may be applied using a two or more step coating method. The polyurethane coatings formed with those compositions using the methods described herein have a high degree of elasticity and/or flexibility. In addition, the compositions may be formulated so that they comprise low amounts of EPA exempt VOC(s) (volatile organic compound(s)) and/or low amounts of non-exempt VOC(s), thereby providing not only highly durable elastic/flexible hydrophobic and/or oleophobic coating compositions, but also a variety of environmental benefits. The coating compositions described herein remain substantially hydrophobic and/or oleophobic when abraded, and have increased durability and/or life span when subjected to normal wear and tear.

BRIEF DESCRIPTION OF THE DRAWINGS

FIG. 1 depicts a shower test apparatus. The upper panel shows the showerhead with 70 nozzles with a 1 mm diameter orifice arranged in 5 spokes of 5 nozzles and 15 spokes of 3 nozzles about a central point on a circular showerhead. For testing the showerhead delivers approximately 6 liters of potable tap water per minute using about 137900 Pa (Pascals) to 310275 Pa. The lower panel depicts a sample, which is placed about 1.5 meters below the showerhead and subject to the shower.

DETAILED DESCRIPTION

Embodiments of coating methods, compositions, and treatments are provided that impart a variety of desirable characteristics to objects and their surfaces, including hydrophobicity (including superhydrophobicity), oleophobicity (including superoleophobicity), and/or anti-icing. As used herein, the term "hydrophobicity" and the abbreviation HP includes superhydrophobicity, and the term "oleophobicity" and the abbreviation OP includes superoleophobicity. The abbreviation "HP/OP" is used collectively herein to mean HP and/or OP and may also include anti-icing properties (including ice formation, adherence and/or accumulation). Treating surfaces with coatings having HP/OP characteristics can result in objects and surfaces with a variety of advantageous properties including, but not limited to, resistance to wetting, corrosion, swelling, rotting, cracking or warping, exfoliation, fouling, dust and/or dirt accumulation on surfaces (self-cleaning), and resistance to surface ice formation, adherence and/or accumulation. Not only do embodiments of the coating compositions and treatments described herein provide properties including HP/OP, but the coatings also are durable in that they substantially retain those properties despite some amount of mechanical abrasion. In addition to providing durable HP/OP behavior, embodiments of the flexible polyurethane coatings can also remain flexible and provide substantial resistance to cracking, peeling, and delamination from the coated surface over a wide range of temperatures.

Embodiments of the HP/OP polyurethane coatings described herein may be applied in a process comprising two or more steps in which a first composition applied comprises a polyurethane binding agent or "binder" forming composition and optionally comprises first particles. Once applied, the coating formed by the first composition is termed a "binder," a "base coating," or a "base coat," particularly when dried. Following the application of the base coat, an amount of a second composition is applied to the base coat. The second composition comprises second particles that are treated to cause the second particles, and the coatings into which they are suitably incorporated, to display advantageous properties including HP/OP and/or anti-icing behavior. The second composition may be applied with the use of a liquid solvent or without the use of a liquid solvent, for example by using a stream of gas to contact the second particles with a surface comprising the first composition. Accordingly, the second composition may be applied to the base coat while it is wet with or without the use of a solvent, or with the use of a suitable solvent after the base coat has dried to the touch, but before it has fully dried and/or set.

Alternatively, depending on the polyurethane binder formed by the first composition and the carrier/solvent employed in the second composition, the second composition may be applied to the polyurethane after the base coat has dried and/or set, if the second composition carrier/solvent employed swells, softens, or otherwise permits the base coat to bind the second particles.

The use of second composition coating compositions comprising solvents that can be applied to the base coat after it has dried and set permits repair of coatings that have been abraded or otherwise damaged to the point where the desired HP/OP properties is/are no longer observed. Provided the base coat is intact, or the base coat has not been damaged to the point that material underlying the base coat is exposed, repair is accomplished by the reapplication of the second composition which comprises second particles.

Where the HP/OP coatings have been abraded so as to compromise the polyurethane base coating or its properties (e.g., abraded, worn too thin, or damaged to the point where the surface of the coated object or underlying material such as a primer is exposed), the coating may be reapplied to the abraded area (i.e., it may be repaired) by repeating the application of both the first and second compositions. Suitable repair/preparation of exposed/damaged surfaces and/or underlying primers may be required prior to reapplication of the polyurethane coating.

Diverse polyurethane binders, first particles, and second particles may be employed in the methods and compositions described herein. In some embodiments described herein, the coating formed by the application of the first and second compositions will have colorants (e.g., insoluble pigments or colored first and/or second particles) that may render them opaque or block the transmission of light. Embodiments of such coating compositions, materials, and compositions are described more fully below.

Selection of first particles and second particles needs to include consideration of not only the desired properties of the coating and the ultimate conditions to which the coating will be subject in use, but also the process used to prepare the coating. Where, for example, particles must withstand elevated temperatures or specific solvents in the coating process, they should be selected so as to be suitable for use in the required temperature ranges or in the required solvents. For example, in those embodiments where coatings or the first and/or second particles are intended for use at elevated temperatures (e.g., above room temperature), the particles need to be compatible with the elevated temperatures that the coatings will be subjected to when in use and/or in processes employed to prepare the coatings. Similarly, the particles should be selected to be compatible with solvents used in the application process and with solvents the coatings will become exposed to in use.

In methods described herein, where second particles are applied to a base coat on a substrate or a substrate coated with a primer, the methods can produce coatings having (i) a surface in contact with said substrate or primer, and (ii) an exposed surface that is not in contact with the substrate (or primer) where the surface in contact with the substrate or primer and the exposed surface bear different amounts of first particles, second particles, or both first and second particles. In some embodiments the exposed surface can have a greater amount of first and/or second particles on, at, or adjacent to the exposed surface, compared to the amount of first and/or second particles at or adjacent to the surface of the coating that is in contact with the substrate or primer. In one embodiment the coatings have a greater amount of second particles on, at, or adjacent to the exposed surface than the surface of the coating that is in contact with the substrate or primer. In some embodiments, the coatings may have no second particles at the surface in contact with the substrate or primer and second particles on, adjacent to, and/or near the exposed surface.

The amount of particles in any portion of a coating may be assessed by any means known in the art including, but not limited to, microscopy or electron microscopy. Using those techniques on cross or oblique sections of coatings, the amount (e.g., the number) of particles can be determined. In addition, where it is possible to remove coatings, or where the substrate permits (e.g., it is transparent), the surfaces can be examined directly using microscopy or electron microscopy to determine the amount of particles present at the exposed surface or adjacent to the substrate.

Embodiments of the coatings described herein are durable in that they can withstand some amount of abrasion without a substantial loss of HP/OP properties. To provide an endpoint for the loss of superhydrophobic (SH) behavior as a result of abrasion testing, substantially planar abraded surfaces are tested for their propensity to shed water droplets at an indicated angle of incline (5 degrees unless indicated otherwise). Typically, twenty droplets are placed on the surface to be assessed, which is inclined at the desired angle. The end of SH behavior is indicated when more than half (ten or more drops) stay in place. While such measurements provide a consistent endpoint, a skilled artisan will understand that, even when the endpoint is reached, the abraded surfaces may still be quite hydrophobic, e.g., having water contact angles greater than 130° or 140° in many instances.

Resistance to abrasion may be measured using any method known in the art including, but not limited to, testing with a Taber abrasion-testing instrument (e.g., a Taber "Abraser") or mechanized or manual assessment with a Crockmeter. Alternatively, a manual measure used to assess the durability of surfaces is a glove rub (GR) test. Each of those tests is described in more detail below.

For the purpose of this application, wherever Taber testing results are recited, the tests are conducted on a Taber Model 503 instrument using CS-0 or CS10 wheels with 250 g or 1,000 g loads. Unless indicated otherwise, a load of 1,000 g was employed, and tests were conducted at room temperature at a speed of 95 rpm.

Where resistance to the loss of HP is measured with a Crockmeter, a motorized American Association of Textile Chemists and Colorists (AATCC) CM-5 Crockmeter is employed. The finger of the Crockmeter is fitted with a 14/20 white rubber septum having an outside diameter of 13 mm and an inside diameter of 7 mm with a contact surface area of 94 $mm^2$ (Ace Glass, Inc., Vineland, N.J., Catalog No. 9096-244). The septum is brought into contact with the coating with a force of 9N (Newtons). The end of superhydrophobic behavior is judged by the failure of more than half of the water droplets applied to the tested surface (typically 20 droplets) to run (roll) off when the surface is inclined at 5 degrees from horizontal. Abrasion resistance may also be measured using a manually operated AATCC Crockmeter.

In addition to resisting the loss of HP/OP properties from abrasion, the coatings produced from the compositions described herein also provide durability in the form of resistance to other conditions. The coatings also resist loss of those properties when subject to:

Submersion in water (the duration a coating resists wetting at different depths in water);

Flowing water (the ability of a coating or surface treatment to resist the impact of flowing water such as a shower of water);

Exposure to liquids other than water (chemical durability and resistance to acids, alkalis, salts, and certain organic solvents such as alcohols);

Boiling water;

Salt water, in the form of immersion, spray, or fog; and

Ultraviolet (UV) radiation where UV resistant polyurethanes and/or UV stabilizing agents are employed.

The polyurethane-based coatings described herein have a variety of properties in addition to those listed immediately above including, but not limited to, resisting ice formation and/or adherence to the coating and coating flexibility over a wide range of temperatures (e.g., about 100° C. to about 0° C., or about 100° C. to about −15° C.).

In one embodiment, the HP/OP coatings comprising plastic, glass or rubber first particles (e.g., EXPANCEL spheres or micronized rubber) have a relative electrical permittivity (dielectric constant) at 100 MHz from about 0.2 to about 4 at about 22° C. (e.g., a permittivity from about 0.2 to about 1, from about 1 to about 2, from about 2 to about 3, or from about 3 to about 4) as measured by ASTM D150 using a single 0.11 mm thick film, or three layers of 0.11 mm film to achieve a 0.33 mm thickness.

In addition to their other properties, the HP/OP coatings described herein can be described by their characteristic roughness that may be measured by any means known in the art. In some embodiments, the surface roughness is measured using a Mahr Pocket Surf PS 1 (Mahr Federal Inc., Providence, RI). The roughness of a surface can be expressed using a variety of mathematical expressions including, but not limited to, its Arithmetical Mean Roughness and its Ten-Point Mean Roughness.

The coatings resulting from the application of the compositions provided for herein have in some embodiments a surface with an arithmetical mean roughness in a range selected from: greater than about 1.2 microns to about 3 microns; greater than about 2 microns to about 4 microns; greater than about 3 microns to about 4 microns; from about 4 microns to about 6 microns; from about 4 microns to about 8 microns; from about 4 microns to about 12 microns; from about 4 microns to about 20 microns; from about 5 microns to about 10 microns; from about 5 microns to about 12 microns; from about 5 microns to about 20 microns; from about 6 microns to about 10 microns; or from about 6 microns to about 14 microns.

In other embodiments, the coatings, resulting from the application of the compositions provided for herein, have in some embodiments a surface with a ten point mean roughness selected from: from about 3 microns to about 40 microns; from about 7 microns to about 60 microns; from about 7 microns to about 70 microns; from about 7 microns to about 80 microns; from about 7 microns to about 100 microns; from about 8 microns to about 60 microns; from about 8 microns to about 80 microns; from about 8 microns to about 100 microns; from about 12 microns to about 60 microns; from about 12 microns to about 100 microns; from about 15 microns to about 60 microns; or from about 15 microns to about 100 microns.

A more complete discussion of the coating compositions, their methods of preparation and application, and their properties follows. A skilled artisan will understand that the description and examples set forth herein are provided as guidance, and are not limiting to the scope of the methods and compositions described herein.

1.0 Definitions

For the purposes of this disclosure, a HP material or surface is one that results in a water droplet forming a surface contact angle exceeding about 90° at room temperature (which is about 18° C. to about 23° C. for purposes of this disclosure). Similarly, for the purposes of this disclosure, a SH material or surface is one that results in a water droplet forming a surface contact angle exceeding 150° but less than the theoretical maximum contact angle of 180° at room temperature. As SH surface behavior encompasses water contact angles from about 150° to about 180°, SH behavior is considered to include what is sometimes referred to as "ultrahydrophobic" behavior. For the purpose of this disclosure the term hydrophobic (HP) shall include super-hydrophobic (SH) behavior unless stated otherwise, and any and all embodiments, claims, and aspects of this disclosure reciting hydrophobic behavior may be limited to either hydrophobic behavior that is not superhydrophobic (contact angles from 90°-150°) or superhydrophobic behavior (contact angles of 150° or greater).

For the purposes of this disclosure an OP material or surface is one that results in a droplet of light (white) mineral oil forming a surface contact angle exceeding about 90°. "Light mineral oil" as used herein is mineral oil having specific gravity at 25° C. from 0.869 to 0.885 g/cc, a kinematic viscosity of 64.5-69.7 mm2/second at 40° C., and a Saybolt viscosity of 340-360 SUS at 37.8° C. (100° F.) (e.g. Kaydol, White Mineral Oil). Similarly, for the purposes of this disclosure a SOP material or surface is one that results in a droplet of light mineral oil forming a surface contact angle exceeding 150° but less than the theoretical maximum contact angle of 180° at room temperature. For the purpose of this disclosure the term oleophobic (OP) shall include superoleophobic (SOP) behavior unless stated otherwise, and any and all embodiments, claims, and aspects of this disclosure reciting oleophobic behavior may be limited to either oleophobic behavior that is not superoleophobic (contact angles from 90°-150°) or superoleophobic behavior (contact angles of 150° or greater).

Anti-icing surfaces are surfaces that are resistant to ice formation and/or accretion in dynamic testing, or that prevent ice that does form from adhering to the surface (i.e., ice that forms can be removed with less force than from untreated surfaces (e.g., metal surfaces).

For the purpose of this disclosure, HP/OP denotes hydrophobic behavior (including superhydrophobic behavior) or properties and/or oleophobic (including superoleophobic behavior) behavior or properties. HP/OP behavior may be understood to include anti-icing properties and any embodiment recited as having HP/OP behavior may be recited as having anti-icing properties, unless stated otherwise in this disclosure.

Durability, unless stated otherwise, refers to the resistance to loss of superhydrophobic or superoleophobic properties due to mechanical abrasion.

Alkyl as used herein denotes a linear or branched alkyl radical or group. Alkyl groups may be independently selected from $C_1$ to $C_{20}$ alkyl, $C_2$ to $C_{20}$ alkyl, $C_4$ to $C_{20}$ alkyl, $C_6$ to $C_{18}$ alkyl, $C_6$ to $C_{16}$ alkyl, or $C_6$ to $C_{20}$ alkyl. Unless otherwise indicated, alkyl does not include cycloalkyl.

Cycloalkyl as used herein denotes a cyclic alkyl radical or group. Cycloalkyl groups may be independently selected from: $C_4$ to $C_{20}$ alkyl comprising one, two, or more $C_4$ to $C_8$ cycloalkyl functionalities; $C_6$ to $C_{20}$ alkyl comprising one, two, or more $C_4$ to $C_8$ cycloalkyl functionalities; $C_6$ to $C_{20}$ alkyl comprising one, two, or more $C_4$ to $C_8$ cycloalkyl functionalities; $C_5$ to $C_{18}$ alkyl comprising one, two, or more $C_4$ to $C_8$ cycloalkyl functionalities; $C_6$ to $C_{18}$ alkyl comprising one, two, or more $C_4$ to $C_8$ cycloalkyl functionalities; or $C_6$ to $C_{16}$ alkyl comprising one, two or more $C_4$ to $C_8$ cycloalkyl functionalities. Where two or more cycloalkyl groups are present they may be present as fused rings or in a spiro configuration. One or more hydrogen atoms of the cycloalkyl groups may be replaced by fluorine atoms.

Haloalkyl as used herein denotes an alkyl group in which some or all of the hydrogen atoms present in an alkyl group have been replaced by halogen atoms. Halogen atoms may be limited to chlorine or fluorine atoms in haloalkyl groups.

Fluoroalkyl as used herein denotes an alkyl group in which some or all of the hydrogen atoms present in an alkyl group have been replaced by fluorine atoms.

Fluorotelomer as used herein is a $F(CF_2)_b(CH_2)_mCH_2$— radical or group wherein m has a value from 1-18 or a range selected from 2-18, 4-18, 6-16, 8-14, 2-4, 2-6, 2-10, 4-12, 6-14, 8-16, or 10-18 and the value of b may be independently selected from 2, 4, 6, 8, 10, 12, 14, 16, or 18, or a range selected from 2-18, 4-18, 6-16, 8-14, 2-10, 4-12, 6-14, 8-16, or 10-18.

Perfluoroalkyl as used herein denotes an alkyl group in which fluorine atoms have been substituted for each hydrogen atom present in the alkyl group.

For the purpose of this disclosure, unless stated otherwise, when content is indicated as being present on a "weight basis," the content is measured as the percentage of the weight of the compositions indicated to the total weight of the composition (including recited/required solvents). Unless expressly stated, optional solvents are not included in the weight of the composition.

"Colorant" as used herein is a material added to the coating composition to cause a change in color, i.e., become colored. Colorants can be dyes which bind at least a portion of the material to be colored, insoluble pigments that are dispersed in at least a portion of the material to be colored, colored chemicals that are dispersed or dissolved in at least a portion of the material to be colored, or inks, which may be any combination of dyes, pigments and colored chemicals. In some embodiments, first or second particles may comprise colorants or may be prepared from materials that are colored.

For the purpose of this disclosure, polyether, polyester, polycarbonate, and polyamide polyols are polyethers, polyesters, polycarbonates, and polyamides, having three or more ether, ester, carbonate, or amide linkages in the polyalcohol (polyol) molecule respectively.

As used herein, a polyacrylate polyol is a polymer having at least three acrylate monomers (alpha-beta unsaturated carboxylic acids or their esters) incorporated into the polyol. The monomers are incorporated into the polyol through reactions of their alpha-beta double bonds with concomitant loss of the olefinic nature of the monomers. Examples of acrylate monomers include: methacrylates, methyl acrylate, ethyl acrylate, 2-chloroethyl vinyl ether, 2-ethylhexyl acrylate, hydroxyethyl methacrylate, butyl acrylate, butyl methacrylate. Where a branched polyol is desired, the polyacrylate may include acrylate monomers having more than one, two and/or three double bonds, such as trimethylolpropane triacrylate (TMPTA).

"One-component" or "1K" as used herein describes polyurethane forming compositions comprising at least polyisocyanate, polyalcohol and any necessary catalyst. One-component compositions will, without adding additional components, form a polyurethane coating. Examples of 1K coatings include moisture curing polyurethanes and latent polyurethanes (e.g., polyurethanes having a latent catalyst or blocked polyisocyanate that require heating to activate and set the polyurethane).

Two-component" or "2K" as used herein describes polyurethane forming compositions that are provided as two or more components that have to be mixed to provide in a single mixture all of the components needed to form a polyurethane (e.g., each component lacks at least one of a polyisocyanate, a polyalcohol, or a necessary catalyst). Two-component systems typically have a limited time period (pot life) where they can be applied after all components are mixed as the polyurethane forming reaction will cause the mixture to increase in viscosity and harden. Two-component systems can comprise latent components that will lengthen the pot life of the composition, but which may then require baking to form the polyurethane.

2.0 Polyurethane Binders

Polyurethanes are polymers consisting of a chain of organic units joined by urethane (carbamate) linkages. Polyurethane polymers are typically formed through polymerization of at least one type of monomer/polymer containing at least two isocyanate functional groups with at least one other monomer/polymer containing at least two hydroxyl (alcohol) groups. A catalyst may be employed to speed the polymerization reaction. Other materials may be present in the polyurethane first compositions including, but not limited to, surfactants, UV stabilizers, colorants, and plasticizers.

Polyurethane polymers employed as binders/base coats in the preparation of highly flexible HP/OP coatings comprise urethane containing segments typically formed from the reaction of polyisocyanate containing compounds (i.e. compounds with two or more isocyanate groups) and long chain molecules comprising at least two alcohols ("polyalcohol" or "polyol"). The use of polyisocyanates, and hydroxyl bearing polymers (e.g., polyether, polyester, polycarbonate, polyamide, and/or polyacrylate polymers) as the polyol and limited amounts of covalent crosslinking results in a combination of both hard (polyurethane) and soft polymeric polyol segments within the same polymer chain. That combination results in polyurethanes having essentially linear alternating segments derived from the polyisocyanates and polyols joined by urethane linkages (i.e., a substantially linear polymer with a repeating "ABAB . . . " pattern). Suitable polyurethanes, such as those having an "ABAB . . . repeat," may have a hardness in a range from about a Shore A hardness of about 50 to a Shore D hardness of about 70 (ASTM D2240). Shore A measurements are generally best below a value of 92 for very flexible polyurethanes, and the Shore D scale is more appropriate for stiffer polyurethane coatings having Shore A values greater than 92. Accordingly, in some embodiments the polyurethanes have a Shore A hardness from about 30 to about 92, about 30 to about 60, about 40 to about 70, or about 70 to about 92; in other embodiments the polyurethanes have a Shore D hardness in a range selected from about 35 to about 70, about 35 to about 50, about 45 to about 60, or about 50 to about 70. Very flexible polyurethanes may find use under conditions where the coating is subject to changes in shape (e.g., repeated flexing or bending). Stiffer polyurethanes find use in applications where higher wear resistance is required. Such polyurethane polymers display Taber abrasion (ASTM D4060) in a range of 2 to 35 mg weight loss for 1,000 cycles. The polyurethanes used in the base coating may have ultimate elongation (elongation at break) greater than 90%, 100%, 110%, 120%, 140%, 160%, 180%, 200%, 250%, 300%, 350%, 400%, or 420% using ASTM D4120 along with excellent flexibility as shown by no cracking or tape removal of the coating per ASTM D4145-10, particularly at low temperatures where other polymers may become brittle. The coatings also display good chemical resistance, such as salt spray resistance greater than 1,000, 2,000 or 3,000 hours under ASTM B117.

Without wishing to be bound by any theory, the urethane containing segments may provide hardness and chemical resistance through the formation of strong hydrogen bonds; the hydrogen bonding can be considered a weak form of self-crosslinking (compared to covalent bond type crosslinking). The polymeric polyols from which the polyurethane is made may contribute to the flexibility (particularly at low temperatures), impact resistance, and to a large extent, the film forming capabilities of the coatings. Accordingly, the flexibility and durability observed with the present coatings appear to result from a combination of the use of long chain polymeric polyols and a low covalent crosslink density. As noted above, lowering the crosslink density of polyurethanes results in a polymer that has increased linear structure and enhanced elastomeric properties. The low crosslinking density can be described as a decrease in functionality of either or both the polyisocyanate or polyalcohol. A functionality close to two (2) is sought (e.g., 2.01-2.1, 2.1-2.2, 2.2-2.3, or 2.3-2.35). The more elastic binder allows for dissipation of abrasive forces and thereby protects the micron size features of the coating, which affords a longer lasting HP/OP characteristic.

Although compositions used to form the polyurethane binders described herein may be organic solvent solution-based compositions, they may be formulated to employ VOC exempt solvents or as waterborne polyurethanes. Indeed, waterborne one-component (1K) self-crosslinking and two-component (2K) waterborne polyurethanes (polyurethane dispersions or "PUD"s) may be employed.

2.1 Isocyanates Utilized in Forming Polyurethane Binders

A wide variety of aliphatic and aromatic polyisocyanates can be used to form the flexible polyurethane binders of the HP/OP coatings described herein. In one embodiment, the polyisocyanates have a functionality of two (i.e., diisocyanates with two isocyanate groups per molecule such as hexamethylene diisocyanate "HDI"), and in another embodiment they may have a functionality of three (e.g., HDI trimers). Aliphatic polyisocyanates, which offer the advantage of forming polyurethanes that are resistant to degradation induced by UV light, include isophorone diisocyanate, hexahydro toluene diisocyanates, and hexamethylene diisocyanate and multimers thereof such as HDI trimers and biurets. Aromatic polyisocyanates include Methylene Diphenyl Diisocyanate ("MDI"). MDI exists in three isomers, 2,2'-MDI, 2,4'-MDI, and 4,4'-MDI, with the 4,4' isomer most widely used; however, mixtures of two or three MDI isomers may also be employed. Polymeric MDI molecules may also be used, however, these are not diisocyanates and their use results in crosslinking of the polymer which can reduce the flexibility of the coating. Another aromatic diisocyanate that may be employed is Toluene diisocyanate ("TDI" —CH$_3$C$_6$H$_3$(NCO)$_2$). Of the six possible TDI isomers, 2,4-TDI (CAS: 584-84-9) is sometimes used as a single isomer in preparing polyurethanes. The compound 2,6-TDI (CAS: 91-08-7) is often utilized in combination with the 2,4-TDI as 80/20 and 65/35 mixtures of the 2,4 and 2,6 isomers respectively.

In one set of embodiments the polyisocyanate employed in the coating compositions has an average functionality greater than 2.5, 2.6, 2.7, 2.8, 2.9, 3.0, 3.1, 3.2, 3.3, 3.4 or 3.5. The average molecular weight of such polyisocyanate components is in a range selected from 400-2,000, 500 to 1,000, 750 to 1,500 or 1,000 to 2,000.

In one set of embodiments the polyisocyanate(s) employed in the coating compositions has an average functionality in a range selected from 2.0-2.2, 2.2-2.4, 2.4-2.6, 2.6-2.8, 2.8-3.0, 3.0-3.2, 3.2-3.4, 3.4-3.5 or greater than 3.5. The average molecular weight of such polyisocyanate components can be in a range selected from 400 to 2,000, 500 to 1,000, 750 to 1,500 or 1,000 to 2,000. Where more than one polyisocyanate is employed, the average molecular weights are calculated taking into account the portion of molecules (mole fraction) of each polyisocyanate and its molecular weight. Such polyisocyanates may be combined with polymeric polyols having an average molecular weight from about 400 to about 10,000 Daltons (e.g., in a range selected from 400-1,000, 1,000-4,000, 4,000-8,000, 8,000-10,000 or 500-4,000 Daltons) that have an average hydroxyl functionality in a range selected from 2.0-2.1, 2.01-2.1, 2.1-2.2, 2.2-2.3, 2.3-2.35, 2.0-2.15, 2.01-2.15, 2.15-2.3, 2.01-2.3 or 2.0-2.35.

In one embodiment the polyisocyanate(s) employed in the coating compositions has an average functionality of 3.0, and an average molecular weight in a range selected from 400 to 2,000, 500 to 1,000, 750 to 1,500 or 1,000 to 2,000. Such polyisocyanate(s) may be combined with polymeric polyols having an average molecular weight from about 400 to about 10,000 Daltons (e.g., in a range selected from 400-1,000, 1,000-4,000, 4,000-8,000, 8,000-10,000 or 500-4,000 Daltons) that have an average hydroxyl functionality in a range selected from 2.0-2.1, 2.01-2.1, 2.1-2.2, 2.2-2.3, 2.0-2.15, 2.01-2.15, or 2.15-2.3.

As discussed below, isocyanates present in the coating composition may be blocked as one means of forming a 1K coating composition.

2.2 Polyols Utilized in Forming Polyurethane Binders

The polyols used to form the flexible HP/OP polyurethanes described herein include long chain molecules such as polyether, polyester, polycarbonate, polyamide, and/or polyacrylate (polymers of polyacrylic acid and/or esters of polyacrylic acid) polymers typically having an average hydroxyl functionality close to two. Such polymeric polyols may have an average molecular weight from about 400 to about 10,000 Daltons (e.g., in a range selected from 400-1,000, 1,000-4,000, 4,000-8,000, 8,000-10,000 or 500-4,000 Daltons). Where more than one polyol is employed, the average molecular weights are calculated taking into account the portion of molecules (mole fraction) of each polyol and its molecular weight.

The average functionality, or more specifically the average hydroxyl functionality, is determined to be the number of hydroxyl groups per molecule and is calculated from the number of hydroxyl groups per molecule and the molar fraction of each molecule. By way of example, where 20% of the molecules have three hydroxyl groups and 80% have two hydroxyl groups the average functionality is (0.2×3)+(0.8×2)=2.2. In some embodiments, one or more, or two or more, polyols are utilized in forming the polyurethane and the average hydroxyl functionality value of the combined polyols is in a range selected from 2.0-2.1, 2.01-2.1, 2.1-2.2, 2.2-2.3, 2.3-2.35, 2.0-2.15, 2.01-2.15, 2.15-2.3, 2.01-2.3 or 2.0-2.35. In one embodiment any one or more of the polyols may have one, two, three, four or more hydroxyl groups, any one, two, three, four or more of which may be terminal hydroxyl functionalities.

In one embodiment, the polyols employed are one or more polyester polyols with a hydroxyl functionality in a range selected from 2.01-2.1, 2.1-2.2, and 2.2-2.3. In another embodiment, the polyols employed are one or more polyester acrylic polyols with a hydroxyl functionality in a range selected from 2.01-2.1, 2.1-2.2, and 2.2-2.3. In another embodiment, the polyols employed comprise one or more, two or more, or three or more of a polyether, polyester, polycarbonate, polyamide, and/or polyacrylate polyols and have a hydroxyl functionality in a range selected from 2.01-2.1, 2.1-2.2, and 2.2-2.3. In any of such embodiments the polymeric polyols may have an average molecular weight from about 400 to about 10,000 Daltons (e.g., in a range selected from 400-1,000, 1,000-4,000, 4,000-8,000, 8,000-10,000 or 500-4,000 Daltons).

In some embodiments the polyol comprises one or more unsaturated polyesters. Unsaturated polyesters traditionally have been prepared as polycondensation products based on saturated and unsaturated dicarboxylic acids (e.g., maleic or fumaric acids) and primary diols. In some embodiments the polyesters are crosslinked (e.g., with styrene) by exposing the unsaturated resin to a metal salt, such as a cobalt salt, and an organic peroxide which generates free radicals.

In some embodiments the polyol comprises one or more, or two or more, saturated or unsaturated polyethers (e.g., polymers comprising two or more different types of monomer or mixtures of two or more polymers formed from different monomers). Polyether polyols are typically prepared from one or more or two or more epoxides.

In some embodiments the polyol comprises one or more saturated polyacrylates.

2.3 The Proportions of Polyisocyanates and Polyols and the Degree of Crosslinking in Polyurethane Binders and Flexible Coatings Lowering the crosslink density of the polyurethanes results in polymers that have increased linear structure and enhanced elastomeric properties. Lower crosslinking can be described as a decrease in functionality of either or both the polyisocyanate or polyol components of polyurethanes. As the functionality of the components approaches 2 the polyurethanes and the HP/OP coatings formed from the polyisocyanate and polymeric polyol compositions described herein become more elastomeric in their properties. The elasticity of the coating allows for the dissipation of energy associated with abrasive forces, and thereby protects the micron size features of the coatings including the association with small particles such as the second particles that render the composition hydrophobic. Accordingly, this affords coatings with a longer lasting hydrophobic/oleophobic character.

In preparing the polyurethanes employed in the coating described herein, the ratio or equivalent amounts of isocyanate to alcohol functionalities on a mole basis are normally greater than 1.0. That is to say, an excess amount of the isocyanate is typically employed as an excess of isocyanate generally insures better curing behavior and better physical properties in the cured coating. This excess is in the range of 1.0 to 15.0 mole % (e.g., 1%-5%, 5%-10%, or 10%-15%).

In one embodiment, the polymer formed from hexamethylene diisocyanate (HDI) having a functionality of 3 (e.g., Desmodur N-100) is reacted with Desmophen 670 BA, which is a polyester polyol having a functionality slightly greater than 2. The resultant polymer makes an effective base coat and can be flexed more than 180 degrees without crazing or cracking. This mixture is typically diluted with a mixture of t-butyl acetate and methyl acetate. This solvent mixture is aprotic and as such is appropriate for urethane systems. Those solvents are also VOC exempt per the US EPA and the California SCAQMD (South Coast Air Quality Management District). The base coat typically contains first particles from 20 to 70 microns in size. A top coat comprising second particles rendered HP/OP, which is known as a second composition, is also used. The second particles can be applied in the absence of solvents, or may be suspended in a solvent such as hexane or acetone. Where acetone is employed it is also possible to incorporate into the top coat a fluoropolymer such as the FEVE polymers found in LUMIFLON products (e.g., LUMIFLON LF200 by Asahi Glass).

2.4 Curing and Catalysts Utilized in Forming Polyurethane Binders

Conditions for curing polyurethane coatings depend largely on the type of polyurethane composition, the presence of catalysts and environmental conditions. Polyurethane catalysts can be classified into two general categories, amines and metal complexes.

Typically, amine catalysts are tertiary amines such as triethylenediamine (TEDA, 1,4-diazabicyclo(2.2.2)octane or DABCO), dimethylcyclohexylamine (DMCHA), and dimethylethanolamine (DMEA). Catalysts containing a hydroxyl group or secondary amine that can react with the polymer matrix can replace traditional catalysts, and thereby reduce the amount of amine that can be released from the polymerized coating or base coating.

A variety of metallic compounds based on mercury, lead, tin, bismuth, and zinc can act as catalyst for polyurethane forming reactions. In one embodiment, mercury carboxylates are employed as catalysts for polyurethane elastomers, coatings and sealant applications, as they are selective towards the polyol and isocyanate reaction. They are, however, toxic. In other embodiments, bismuth and/or zinc carboxylates are used in polyurethane forming reactions. Alkyl tin carboxylates, oxides and mercaptide oxides are also useful in polyurethane forming applications. In embodiments where the formulations contain water, tin carboxylates, which are susceptible to hydrolysis, may be utilized.

The curing properties of moisture-curing one-component coatings are determined to a large degree by the nature of the particular isocyanates employed and catalysts (e.g., tin base catalysts such as dibutyltin dilaurate) may be used to reduce/control cure times. One-component coatings based on aliphatic isocyanates (HDI, IPDI, DESMODUR® W diisocyanate) often require longer drying times than compositions employing aromatic isocyanates (e.g., TDI and/or MDI). Drying and curing times depend on both the temperature and the amount of atmospheric moisture. Accordingly, aliphatic polyisocyanate based moisture-cured coatings may require catalysts to provide reasonable cure times in situations where there is a low atmospheric moisture content.

Where necessary to accomplish curing in a reasonable amount of time the coating compositions may be heated (e.g., heated in a range from 100-150, 150-200, 200-250 250-300 and/or 300-350° C.) to increase the rate of reaction between the bond forming components. Baking/heating may be useful where one or more of the components for forming the polyurethane is present in a blocked form in the coating composition. Blocked components may include one or more of blocked isocyanates, blocked catalysts, and/or blocked alcohols.

For technical and economic reasons, blocked polyisocyanates are used where a one-component (1K) coating system is required. Such 1K systems find use, for example, where the presence of free isocyanate must be excluded, heat curing is possible, and the high performance of polyurethane coatings is desired.

A blocked polyisocyanate can be defined as an isocyanate reaction product which is stable at room temperature but dissociates to regenerate isocyanate functionality under the influence of heat. Temperatures between 120 and 250° C. are typically employed to release the blocking groups by breaking one or more labile bonds. The released blocking agent is usually volatilized from the coating. The resulting polyisocyanates can react with other active hydrogen-containing compounds to form more thermally stable urethane or urea linkages.

The breaking temperature of the labile bond(s) of a blocked polyisocyanate depend on the structures of the polyisocyanates and the blocking groups utilized. Blocked polyisocyanates based on aromatic polyisocyanates dissociate at lower temperatures than those based on aliphatic ones. The dissociation temperatures of some blocked polyisocyanates decrease in the order: alcohols>epsilon-caprolactam>phenols>methyl ethyl ketoxime>active methylene compounds. In some embodiments, blocked polyisocyanates undergo alcoholysis (or aminolysis) in the presence of coreactants at temperatures lower than their dissociation; the curing temperature of the formulated coating system being dependent on the type of coreactant utilized. Curing times are shorter when aliphatic amines are used compared to those utilizing hydroxy-functional compounds.

Although it is highly desirable to have coating systems which cure with minimal energy input, the storage stability of the formulated coating generally decreases with lower curing temperatures. For example, alcohol blocked aromatic polyisocyanates combined with polyether coreactants are storage stable for years at room temperature; however, temperatures in excess of 200° C. are necessary to effect cure of the coatings. In contrast, phenol blocked aromatic polyisocyanates react with aliphatic diamines at room temperature on the substrate as well as in the can. Those systems emphasize that it is not possible to formulate a one-component, one-phase system which is stable infinitely at room temperature, yet cures rapidly at only slightly elevated temperatures.

Blocked polyisocyanates can be used to crosslink both solvent-borne and waterborne resins. The blocked polyisocyanates offer wide formulation latitude. They can be added to the coreactant resins providing one-component coatings with excellent shelf life, and result in crosslinked coatings within reasonable curing cycles (times). Coatings obtained show high-performance with the unique combination of high hardness and good flexibility. Coatings based on water-dispersible blocked polyisocyanate crosslinkers and suitable waterborne polymers approach the performance levels previously obtained only by solvent-borne coatings.

In one embodiment, the polyurethanes described herein are not formed by radical polymerization. In another embodiment, the polyurethanes are not light (e.g., UV) polymerized or cured.

2.5 Liquid Components Utilized in Compositions for Forming Polyurethane Binders

Some solvents compatible with such systems include n-butyl acetate, toluene, xylene, ethyl benzene, cyclohexanone, isopropyl acetate, and methyl isobutyl ketone and mixtures thereof.

Some water based systems such as polyurethane dispersions (PUDs) can also be employed. In addition to water, these use solvents such as acetone, N-methylpyrollidone, ethylene glycol dimethyl ether and mixtures thereof.

3.0 Particles Employed in HP/OP Coatings 3.1 First Particles

Embodiments of the coatings disclosed herein may comprise particles that are added to the first compositions (binder forming compositions) to improve the mechanical properties of the coatings, e.g., the durability of the HP/OP coatings. A wide variety of such particles, which are also known as extenders or fillers, may be added to the binders. Those particles are denoted herein as "first particles" because the coatings described herein may have one or more additional types of particles. Such first particles that can be employed in the HP/OP coatings described herein include, but are not limited to, particles comprising: wood (e.g., wood dust), glass, metals (e.g., iron, titanium, nickel, zinc, tin), alloys of metals, metal oxides, metalloid oxides (e.g., silica), plastics (e.g., thermoplastics), carbides, nitrides, borides, spinets, diamonds, and fibers (e.g., glass fibers).

Numerous variables may be considered in the selection of first particles. These variables include, but are not limited to, the effect the first particles have on the resulting coatings, their size, their hardness, their compatibility with the binder, the resistance of the first particles to the environment in which the coatings will be employed, and the environment the first particles must endure in the coating and/or curing process, including resistance to temperature and solvent conditions. In addition, if light is used for curing the coatings, or if the coatings are intended for extended exposure to sunlight, the particles must be resistant to the required light exposure conditions (e.g., resistant to UV light employed in curing or sunlight).

In embodiments described herein, first particles have an average size in a range selected from about 1 micron ($\mu m$) to about 300 $\mu m$ or from about 30 $\mu m$ to about 225 $\mu m$. Within the broader ranges, embodiments include ranges of first particles having an average size of from about 1 $\mu m$ to about 5 $\mu m$, from about 5 $\mu m$ to about 10 $\mu m$, from about 10 $\mu m$ to about 15 $\mu m$, from about 15 $\mu m$ to about 20 $\mu m$, from about 20 $\mu m$ to about 25 $\mu m$, from about 1 $\mu m$ to about 25 $\mu m$, from about 5 $\mu m$ to about 25 $\mu m$, from about 25 $\mu m$ to about 50 $\mu m$, from about 50 $\mu m$ to about 75 $\mu m$, from about 75 $\mu m$ to about 100 $\mu m$, from about 100 $\mu m$ to about 125 $\mu m$, from about 125 $\mu m$ to about 150 $\mu m$, from about 150 $\mu m$ to about 175 $\mu m$, from about 175 $\mu m$ to about 200 $\mu m$, from about 200 $\mu m$ to about 225 $\mu m$, and from about 225 $\mu m$ to about 250 $\mu m$. Also included within this broad range are embodiments employing particles in ranges from about 10 $\mu m$ to about 100 $\mu m$, from about 10 $\mu m$ to about 200 $\mu m$, from about 20 $\mu m$ to about 200 $\mu m$, from about 30 $\mu m$ to about 50 $\mu m$, from about 30 $\mu m$ to about 100 $\mu m$, from about 30 $\mu m$ to about 200 $\mu m$, from about 30 $\mu m$ to about 225 $\mu m$, from about 50 $\mu m$ to about 100 $\mu m$, from about 50 $\mu m$ to about 200 $\mu m$, from about 75 $\mu m$ to about 150 $\mu m$, from about 75 $\mu m$ to about 200 $\mu m$, from about 100 $\mu m$ to about 225 $\mu m$, from about 100 $\mu m$ to about 250 $\mu m$, from about 125 $\mu m$ to about 225 $\mu m$, from about 125 $\mu m$ to about 250 $\mu m$, from about 150 $\mu m$ to about 200 $\mu m$, from about 150 $\mu m$ to about 250 $\mu m$, from about 175 $\mu m$ to about 250 $\mu m$, from about 200 $\mu m$ to about 250 $\mu m$, from about 225 $\mu m$ to about 275 $\mu m$, or from about 250 $\mu m$ to about 300 $\mu m$. The size of first particles from commercial sources (see Tables 4 and 5) may be available from the manufacturer, or alternatively may be determined by known methods, such as laser diffraction using a MICROTRAC® Bluewave 3000(s) as described for second particles in the subsequent section.

First particles may be incorporated into the polyurethane binders at various ratios depending on the binder composition and the first particle's properties. In some embodiments, the first particles may have a content range selected from about 0.01% to about 60% or more by weight. Included within this broad range are embodiments in which the first particles are present, by weight, in ranges from about 0.02% to about 0.2%, from about 0.05% to about 0.5%, from about 0.075% to about 0.75%, from about 0.1% to about 1%, from about 0.5% to about 2.5%, from about 2% to about 5%, from about 5% to about 10%, from about 10% to about 15%, from about 15% to about 20%, from about 20% to about 25%, from about 25% to about 30%, from about 30% to about 35%, from about 35% to about 40%, from about 40% to about 45%, from about 45% to about 50%, from about 50% to about 55%, from about 55% to about 60%, and greater than 60%. Also included within this broad range are embodiments in which the first particles are present, by weight, in ranges from about 4% to about 30%, from about 5% to about 25%, from about 5% to about 35%, from about 10% to about 25%, from about 10% to about 30%, from about 10% to about 40%, from about 10% to about 45%, from about 15% to about 25%, from about 15% to about 35%, from about 15% to about 45%, from about 20% to about 30%, from about 20% to about 35%, from about 20% to about 40%, from about 20% to about 45%, from about 20% to about 55%, from about 25% to about 40%, from about 25% to about 45%, from about 25% to about 55%, from about 30% to about 40%, from about 30% to about 45%, from about 30% to about 55%, from about 30% to about 60%, from about 35% to about 45%, from about 35% to about 50%, from about 35% to about 60%, from about 40% to about 60%, from about 0.01% to about 5%, from about 0.03% to about 1%, from about 0.05% to about 0.15%, from about 0.1% to about 2.5%, from about 0.2% to about 5%, from about 0.05% to about 10%, from about 0.1% to about 10%, from about 0.05% to about 15%, or from about 0.05% to about 20%.

In those embodiments where it is desirable to have coatings that are substantially transparent or translucent, or colored but transparent/translucent (clear or almost clear), it is generally desirable to employ particles that are transparent or have a limited difference in refractive index with the binder medium. In one set of embodiments, clear plastic (e.g., thermoplastic) microspheres are employed in the binder systems to develop surface texture. In another set of embodiments, glass microspheres are employed in the binder systems to develop surface texture. Where coatings are substantially transparent or translucent a colorless coating (one that does not contain a colorant) of 10-15 μm in thickness permits the transmittal of greater than 25, 30, 40, 50, 60 or 70% of a visible wavelength of light that is incident upon the coating at right angles.

In one embodiment, substantially spherical thermoplastic particles are added to the first composition to develop surface texture (e.g., EXPANCEL microspheres or EXPANCEL particles). Such microspheres consist of a polymer shell encapsulating a gas. The average diameter of these hollow spheres typically ranges from 6 to 45 μm and have a density of 1,000 to 1,300 kg/m$^3$ (8.3-10.8 lbs/US Gallon). Upon heating, the microspheres expand and the volume of the microspheres can increase more than 40 times (with the diameter changing, for example, from 10 to 40 μm), resulting in a density below 30 kg/m$^3$ (0.25 lbs/US Gallon). Typical expansion temperatures range from 80 to 190° C. (176-374° F.). When heating the microspheres the pressure of the gas inside the shell increases and the thermoplastic shell softens, resulting in a dramatic increase of the volume of the microspheres. Cooling the microspheres results in the shell stiffening again and produces lighter (lower density) expanded microspheres. Some thermoplastic microspheres produced under the EXPANCEL brand (Akzo Nobel, distributed by Eka Chemicals, Inc., 2240 Northmont Parkway, Duluth, Ga. 30096, USA) are suitable for use in preparing HP/OP, particularly those that are substantially transparent. See Table 4.

TABLE 4

EXPANCEL particles and properties

| Main types | Varieties | Description | Solid content [%] | Density of EXPANCEL [kg/m$^3$] |
| --- | --- | --- | --- | --- |
| Unexpanded microspheres | EXPANCEL WU | Wet, unexpanded microspheres | 60-80 | 1000-1300 |
| | EXPANCEL WUF | Wet, unexpanded microspheres | 60-80 | 1000-1300 |
| | EXPANCEL DU | Dry, unexpanded microspheres | >99 | ~1000 |
| | EXPANCEL DUT | Dry, treated, unexpanded microspheres | >99 | ~1000 |
| | EXPANCEL SL | Wet, salted, unexpanded microspheres | 40 | 1200 |
| | EXPANCEL SLU | Wet, unexpanded microspheres | 44 | 1200 |
| | EXPANCEL MB | Dry, unexpanded microspheres mixed with a matrix, e.g. EVA | 65 (EXPANCEL) | 1000 |
| Expanded microspheres | EXPANCEL WE | Wet, expanded microspheres | 15 | ~30 |
| | EXPANCEL DE | Dry, expanded microspheres | >99 | 25-70 |
| | EXPANCEL DET | Dry, treated, expanded microspheres | >99 | 25 |

Where HP/OP coatings capable of withstanding higher temperatures are desired, such as where polyurethane binders having latent isocyanates or catalysts activated by heating are employed, and particularly where coatings are intended to be substantially transparent, glass microspheres may be employed in place of thermoplastic microspheres. Such glass microspheres include those produced by 3M™ (St. Paul, Minn.) or Sphere One, Inc. (Chattanooga, Tenn.).

3.1.1 Exemplary Sources of First Particles First particles may be prepared from the diverse materials described above. Alternatively, first particles may be purchased from a variety of suppliers. Some commercially available first particles that may be employed in the formation of the HP/OP coatings described herein include those in Table 5.

TABLE 5

First Particles

| First particle No. | First Particle (Filler) ID | First Particle Type | First Particle Details | (g/cc) | Particle Size Range (μm) | Color | Crush Strength (psi) | Source Location |
|---|---|---|---|---|---|---|---|---|
| 1 | K1 | Glass Bubbles | GPS[a] | 0.125 | 30-120 | White | 250 | 3M ™ j |
| 2 | K15 | Glass Bubbles | GPS[a] | 0.15 | 30-115 | White | 300 | 3M ™ j |
| 3 | S15 | Glass Bubbles | GPS[a] | 0.15 | 25-95 | White | 300 | 3M ™ j |
| 4 | S22 | Glass Bubbles | GPS[a] | 0.22 | 20-75 | White | 400 | 3M ™ j |
| 5 | K20 | Glass Bubbles | GPS[a] | 0.2 | 20-125 | White | 500 | 3M ™ j |
| 6 | K25 | Glass Bubbles | GPS[a] | 0.25 | 25-105 | White | 750 | 3M ™ j |
| 7 | S32 | Glass Bubbles | GPS[a] | 0.32 | 20-80 | White | 2000 | 3M ™ j |
| 8 | S35 | Glass Bubbles | GPS[a] | 0.35 | 10-85 | White | 3000 | 3M ™ j |
| 9 | K37 | Glass Bubbles | GPS[a] | 0.37 | 20-85 | White | 3000 | 3M ™ j |
| 10 | S38 | Glass Bubbles | GPS[a] | 0.38 | 15-85 | White | 4000 | 3M ™ j |
| 11 | S38HS | Glass Bubbles | GPS[a] | 0.38 | 15-85 | White | 5500 | 3M ™ j |
| 12 | K46 | Glass Bubbles | GPS[a] | 0.46 | 15-80 | White | 6000 | 3M ™ j |
| 13 | S60 | Glass Bubbles | GPS[a] | 0.6 | 15-65 | White | 10000 | 3M ™ j |
| 14 | S60/HS | Glass Bubbles | GPS[a] | 0.6 | 11-60 | White | 18000 | 3M ™ j |
| 15 | A16/500 | Glass Bubbles | Floated Series | 0.16 | 35-135 | White | 500 | 3M ™ j |
| 16 | A20/1000 | Glass Bubbles | Floated Series | 0.2 | 30-120 | White | 1000 | 3M ™ j |
| 17 | H20/1000 | Glass Bubbles | Floated Series | 0.2 | 25-110 | White | 1000 | 3M ™ j |
| 18 | D32/4500 | Glass Bubbles | Floated Series | 0.32 | 20-85 | White | 4500 | 3M ™ j |
| 19 | Expancel 551 DE 40 d42 | Plastic Microspheres | Dry Expanded | 0.042 ± 0.004 | 30-50 | | | AkzoNobel i |
| 20 | Expancel 551 DE 40 d42 ± 2 | Plastic Microspheres | Dry Expanded | 0.042 ± 0.002 | 30-50 | | | AkzoNobel i |
| 21 | Expancel 461 DE 20 d70 | Plastic Microspheres | Dry Expanded | 0.07 ± 0.006 | 15-25 | | | AkzoNobel i |
| 22 | Expancel 461 DE 40 d60 | Plastic Microspheres | Dry Expanded | 0.06 ± 0.005 | 20-40 | | | AkzoNobel i |
| 23 | Expancel 461 DET 40 d25 | Plastic Microspheres | Dry Expanded | 0.025 ± 0.003 | 35-55 | | | AkzoNobel i |
| 24 | Expancel 461 DET 80 d25 | Plastic Microspheres | Dry Expanded | 0.025 ± 0.003 | 60-90 | | | AkzoNobel i |
| 25 | Expancel 920 DE 40 d30 | Plastic Microspheres | Dry Expanded | 0.030 ± 0.003 | 35-55 | | | AkzoNobel i |
| 26 | Expancel 920 DET 40 d25 | Plastic Microspheres | Dry Expanded | 0.025 ± 0.003 | 35-55 | | | AkzoNobel i |
| 27 | Expancel 920 DE 80 d30 | Plastic Microspheres | Dry Expanded | 0.030 ± 0.003 | 55-85 | | | AkzoNobel i |
| 28 | H50/10000 EPX | Glass Bubbles | Floated Series | 0.5 | 20-60 | White | 10000 | 3M ™ j |
| 29 | iMK | Glass Bubbles | Floated Series | 0.6 | 8.6-26.7 | White | 28000 | 3M ™ j |
| 30 | G-3125 | Z-Light Spheres ™ | CM[b] | 0.7 | 50-125 | Gray | 2000 | 3M ™ j |
| 31 | G-3150 | Z-Light Spheres ™ | CM[b] | 0.7 | 55-145 | Gray | 2000 | 3M ™ j |
| 32 | G-3500 | Z-Light Spheres ™ | CM[b] | 0.7 | 55-220 | Gray | 2000 | 3M ™ j |
| 33 | G-600 | Zeeospheres ™ | CM[b] | 2.3 | 1-40 | Gray | >60000 | 3M ™ j |
| 34 | G-800 | Zeeospheres ™ | CM[b] | 2.2 | 2-200 | Gray | >60000 | 3M ™ j |
| 35 | G-850 | Zeeospheres ™ | CM[b] | 2.1 | 12-200 | Gray | >60000 | 3M ™ j |
| 36 | W-610 | Zeeospheres ™ | CM[b] | 2.4 | 1-40 | White | >60000 | 3M ™ j |
| 37 | SG | Extendosphere ™ | HS[c] | 0.72 | 30-140 | Gray | 2500 | Sphere One f |
| 38 | DSG | Extendosphere ™ | HS[c] | 0.72 | 30-140 | Gray | 2500 | Sphere One f |
| 39 | SGT | Extendosphere ™ | HS[c] | 0.72 | 30-160 | Gray | 2500 | Sphere One f |
| 40 | TG | Extendosphere ™ | HS[c] | 0.72 | 8-75 | Gray | 2500 | Sphere One f |
| 41 | SLG | Extendosphere | HS[c] | 0.7 | 10-149 | Off White | 3000 | Sphere One f |
| 42 | SLT | Extendosphere ™ | HS[c] | 0.4 | 10-90 | Off White | 3000 | Sphere One f |
| 43 | SL-150 | Extendosphere ™ | HS[c] | 0.62 | 70 | Cream | 3000 | Sphere One f |
| 44 | SLW-150 | Extendosphere ™ | HS[c] | 0.68 | 8-80 | White | 3000 | Sphere One f |
| 45 | HAT | Extendosphere ™ | HS[c] | 0.68 | 10-165 | Gray | 2500 | Sphere One f |
| 46 | HT-150 | Extendosphere ™ | HS[c] | 0.68 | 8-85 | Gray | 3000 | Sphere One f |

TABLE 5-continued

First Particles

| First particle No. | First Particle (Filler) ID | First Particle Type | First Particle Details | (g/cc) | Particle Size Range (μm) | Color | Crush Strength (psi) | Source Location |
|---|---|---|---|---|---|---|---|---|
| 47 | KLS-90 | Extendo-sphere ™ | HS[c] | 0.56 | 4-05 | Light Gray | 1200 | Sphere One f |
| 48 | KLS-125 | Extendo-sphere ™ | HS[c] | 0.56 | 4-55 | Light Gray | 1200 | Sphere One f |
| 49 | KLS-150 | Extendo-sphere ™ | HS[c] | 0.56 | 4-55 | Light Gray | 1200 | Sphere One f |
| 50 | KLS-300 | Extendo-sphere ™ | HS[c] | 0.56 | 4-55 | Light Gray | 1200 | Sphere One f |
| 51 | HA-300 | Extendo-sphere ™ | HS[c] | 0.68 | 10-146 | Gray | 2500 | Sphere One f |
| 52 | XIOM 512 | Thermo-plastic | MPR[d] | 0.96 | 10-100 | White | 508 | XIOM Corp. k |
| 53 | XIOM 512 | Thermo-plastic | MPR[d] | 0.96 | 10-100 | Black | 508 | XIOM Corp. k |
| 54 | CORVEL ™ Black 78-7001 | Thermo-plastic | Nylon Powder Coating | 1.09 | 44-74 | Black | | ROHM & HASS g |
| 55 | Micro-glass 3082 | Fibers | MMEGF[e] | 1.05 | 16 × 120 | White | | Fibertec h |
| 56 | Micro-glass 9007D | Fibers Silane-Treated | MMEGF[e] | 0.53 | 10 × 150 | White | | Fibertec h |
| 57 | Tiger Drylac Series 49 | Polyester crosslinked with TGIC (triglycidyl isocyanurate) | | | | | | Tiger Drylac USA, Inc. l |
| 58 | Soft-Sand ® | Rubber based | | | 90, 180, or 300 | Various colors | | SoftPoint Indust. Copley, OH |

[a]GPS—general purpose series
[b]ceramic microspheres
[c]hollow spheres
[d]modified polyethylene resins
[e]microglass milled E-glass filaments
f—Chattanooga, TN
g—Philadelphia, PA
h—Bridgewater, MA
i—Distributed by Eka Chem., Inc., Duluth, GA
j—St. Paul, MN
k—West Babylon, NY
l—St. Charles, IL 3.2 Second Particles The coatings disclosed herein employ second particles (e.g., nanoparticles), which are particles that bear, or are associated with, hydrophobic and/or hydrophobic and oleophobic moieties (i.e., moieties that are covalently or non-covalently bound that impart hydrophobic or hydrophobic and oleophobic properties). The hydrophobic moieties or hydrophobic and oleophobic moieties can be introduced by treating the particles to include compounds such as siloxanes, silazanes, silanes, and/or groups such as alkyl, haloalkyl, fluorohydrocarbon (e.g., fully fluorinated hydrocarbons or partly fluorinated hydrocarbons such as fluorotelomer (fluorotelomer alkyl) or perfluoroalkyl groups), or nonfluorinated hydrocarbons. In an embodiment, second particles suitable for the preparation of HP/OP coatings have a size from about 1 nanometer (nm) to about 25 μm and have one or more chemical moieties (groups or compounds) covalently bound to the particles. In such an embodiment the covalently bound moieties are fluoroalkyl groups or more specifically fluorotelomer alkyl groups.

In one embodiment the second particles have a surface area over 100, 150, 200, 250, or 300 square meters per gram ($m^2/g$) of particulate. In another embodiment, where the particles are fumed silica, the surface area can be about or greater than 150, 175, 200, 225 or 250 $m^2/g$.

Second particles having a wide variety of compositions may be employed in the durable HP/OP coatings described and employed herein. In some embodiments the second particles will be particles comprising metal oxides (e.g., aluminum oxides such as alumina, zinc oxides, nickel oxides, zirconium oxides, iron oxides, or titanium dioxides), or oxides of metalloids (e.g., metalloid oxides such as oxides of B, Si, Sb, Te and Ge) such as glass, silica (e.g., fumed silica), silicates, aluminosilicates, or particles comprising combinations thereof.

Second particles, and particularly second particles prepared using techniques such as fuming (e.g., fumed silica), may be comprised of particles sometimes denoted as "primary particles" As used herein, the term "primary particle size" refers to the size of non-associated particles whose size is typically measured by X-ray Diffraction (XRD), and which have a particle size range typically listed as being from about 1 nm to about 21 nm as measured by XRD. In some instances, such as in the case of fumed silica, the primary particles can be in the range of about 10 nm to about 21 nm, and typically spherical. Primary particles can fuse together to form aggregates from about 21 nm to about 300 nm (about 0.02 microns to about 0.3 microns). Aggregates of some particles, such as fumed silica particles, typically have a mean particle size in the range of about 0.2 to about 0.3 microns (about 200 nm to about 300 nm) as measured by laser diffraction. Aggregates can form larger structures termed agglomerates that range from about 0.3 microns to about 30 microns as measured by laser diffraction. Depending on the conditions, agglomerates can reach sizes as large as 150 microns as measured by laser diffraction. Large agglomerates can be disrupted by techniques such as sonication to produce agglomerates having a mean particle size less than about 25 or 30 microns by laser diffraction. More vigorous disruption techniques, such as micronization or ball milling, can further reduce particle size, for example reducing agglomerates down to the 1 micron range or approaching the size of aggregates; however, further reductions in size are difficult to achieve. Moreover, even after disruption, agglomerates may reform from aggregates under suitable conditions given sufficient time.

For HP or HP/OP second particles with a mean diameter below 21 nm, the size may be available from the manufacturer or may be determined by known methods (e.g., by XRD). For HP or HP/OP second particles having a size in a range with a lower limit greater than 21 nm, the mean diameter may be available from the manufacturer, or may be determined by known methods (e.g., laser diffraction). Laser diffraction measurements of particles may be made employing a MICROTRAC® Bluewave 3000(s) with the particles suspended at 2% by weight in a solvent (e.g., dry acetone). The data may be reported as the mean diameter of the volume distribution ("MV"), the mean diameter of the area distribution ("MA"), or the mean diameter of the number distribution ("MN") where: $MV=\Sigma V_i d_i/\Sigma V_i$; $MN=\Sigma(V_i d_i^2)/\Sigma(V_i d_i^3)$; $MA=\Sigma V_i/\Sigma(V_i/d_i)$; and wherein V =volume percent between sizes, and d=size represented by the center between any two sizes for a series of particle measurements. Unless stated otherwise the particle size is understood to be given as the MN. Where differences based on measurement techniques may arise in the determination of particle size, the laser diffraction size determination is employed for particles with a size (MN value) greater than 21 nm.

Accordingly, the HP or HP/OP second particles may have a size in a range selected from the group consisting of: from about 1 nm to about 21 nanometers (nm), from about 1 nm to about 10 nm, from about 1 nm to about 20 (e.g., 21) nm, from about 1 nm to about 200 nm, from about 1 nm to about 300 nm, from about 10 nm to about 20 (e.g., 21) nm, from about 10 nm to about 200 nm, from about 10 nm to about 300 nm, from about 20 (e.g., 21) nm to about 200 nm, from about 20 (e.g., 21) nm to about 300 nm, from about 200 nm to about 300 nm, from about 200 nm to about 500 nm, from about 250 nm to about 500 nm, from about 250 nm to about 1.0 µm, from about 500 nm to about 2.5 µm, from about 1.0 µm to about 10.0 µm, from about 1 µm to about 20 µm, from about 1 µm to about 40 µm, from about 5 µm to about 20 µm, from about 5 µm to about 50 µm, from about 10 µm to about 100 µm, from about 20 µm to about 50 µm, from about 20 µm to about 100 µm, from about 25 µm to about 35 µm, from about 25 µm to about 50 µm, from about 25 µm to about 75 µm, from about 30 µm to about 50 µm, from about 30 µm to about 75 µm, from about 30 µm to about 100 µm, from about 40 µm to about 60 µm, from about 40 µm to about 100 µm, from about 50 µm to about 80 µm, from about 75 µm to about 100 µm, from about 75 µm to about 125 µm, from about 75 µm to about 130 µm, from about 100 µm to about 125 µm, and from about 100 µm to about 150 µm. Such particles may have a surface area in a range selected from the group consisting of about 50 to about 400, about 50 to about 100, about 50 to about 250, about 100 to about 250, about 250 to about 300, about 280 to about 330, about 300 to about 380, about 250 to about 400, and greater than about 400 m²/g.

In some embodiments, the second particles may have an average size in a range selected from about 1 nm up to about 25 µm or more. Included within this broad range are embodiments in which the second particles have an average size in a range selected from: about 1 nm to about 10 nm, from about 10 nm to about 25 nm, from about 25 nm to about 50 nm, from about 50 nm to about 100 nm, from about 100 nm to about 250 nm, from about 250 nm to about 500 nm, from about 500 nm to about 750 nm, from about 750 nm to about 1 µm, from about 1 µm to about 5 µm, from about 5 µm to about 10 µm, from about 10 µm to about 15 µm, from about 15 µm to about 20 µm, from about 20 µm to about 25 µm, from about 1 nm to about 100 nm, from about 2 nm to about 200 nm, from about 10 nm to about 200 nm, from about 20 nm to about 400 nm, from about 10 nm to about 500 nm; from about 40 nm to about 800 nm, from about 100 nm to about 1 µm, from about 200 nm to about 1.5 µm, from about 500 nm to about 2 µm, from about 500 nm to about 2.5 µm, from about 1 µm to about 10 µm, from about 2 µm to about 20 µm, from about 2.5 µm to about 25 µm, from about 500 nm to about 25 µm, from about 400 nm to about 20 µm, from about 100 nm to about 15 µm, from about 1 nm to about 50 nm, from about 1 nm to about 400 nm, from about 1 nm to about 500 nm, from about 2 nm to about 120 nm, from about 5 nm to about 100 nm, from about 5 nm to about 200 nm; from about 5 nm to about 400 nm; from about 10 nm to about 300 nm; or from about 20 nm to about 400 nm.

In the above-mentioned embodiments, the lower size of second particles may be limited to particles greater than about 20 nm (e.g., 21 nm), about 25 nm, about 30 nm, about 35 nm, about 40 nm, about 45 nm, about 50 nm, or about 60 nm; and the upper size of second particles may be limited to particles less than about 20 µm, about 10 µm, about 5 µm, about 1 µm, about 0.8 µm, about 0.6 µm, about 0.5 µm, about 0.4 µm, about 0.3 µm, about 0.2 µm, or about 100 nm.

Any combination of particle size, particle composition, surface area, and/or percent composition in the coatings recited herein may be employed in preparing the HP/OP coatings described herein. Limitations on the upper and lower size of second particles may be used alone or in combination with any of the above-recited size limits on particle composition, surface area, percent composition in the coatings, and the like.

In some embodiments, the coatings may contain first particles in any of the above-mentioned ranges subject to either the proviso that the coatings do not contain only particles (e.g., first or second particles) with a size of 25 µm or less, or the proviso that the coatings do not contain more than an insubstantial amount of second particles with a size of 25 µm or less (recognizing that separation processes for particles greater than 25 µm may ultimately provide an unintended, insubstantial amount of particles that are 25 µm or less). An insubstantial amount of particles is less than 3% by weight or number of those particles, but it can also be less than 0.1%, 0.2%, 0.5%, 1%, or 2% wherever recited.

In other embodiments, second particles have an average size greater than 30 µm and less than 250 µm, and coatings comprising those particles do not contain more than insubstantial amounts of particles (e.g., first and second particles) with a size of 30 µm or less. In yet other embodiments, the coatings do not contain only particles (e.g., first and second particles) with a size of 40 µm or less, or particles with a size of 40 µm or less in substantial amounts. In addition, in still other embodiments, the coatings do not contain only particles (e.g., first and second particles) with a size of 50 µm or less, or particles with a size of 50 µm or less in substantial amounts.

In other embodiments, such as where the second particles are prepared by fuming (e.g., fumed silica or fumed zinc oxide), the second particles may have an average size in a range selected from about 1 nm to about 50 nm, from about 1 nm to about 100 nm, from about 1 nm to about 400 nm, from about 1 nm to about 500 nm, from about 2 nm to about 120 nm, from about 5 nm to about 100 nm, from about 5 nm to about 200 nm, from about 25 nm to about 100 nm, from about 30 nm to about 200 nm, from about 5 nm to about 400 nm, from about 10 nm to about 300 nm, from about 20 nm to about 400 nm, or from about 50 nm to about 400 nm.

As indicated above, second particles are treated to introduce one or more moieties (e.g., groups or compounds) that impart HP/OP properties to the particles, either prior to incorporation into the compositions that will be used to apply coatings or after incorporation into the coatings. In some embodiments, the second particles are treated with a silanizing agent, a silane, a siloxane or a silazane, to introduce hydrophobic/superhydrophobic and/or oleophobic/superoleophobic properties to the particles (in addition to any such properties already possessed by the particles).

In one embodiment, second particles are silica, silicates, alumina (e.g., $Al_2O_3$), titanium oxide, or zinc oxide that are treated with one or more silanizing agents, e.g., compounds of formula (I) (below). In other embodiments, second particles are comprised of silica, silicates, alumina (e.g., $Al_2O_3$), titanium oxide, or zinc oxide that are treated with a siloxane. In another embodiment, the second particles are silica, silicates, glass, alumina (e.g., $Al_2O_3$), titanium oxide, or zinc oxide, treated with a silanizing agent, a siloxane (e.g., dimethylsiloxane) or a silazane (e.g., hexamethyldisilazane). In another embodiment, the second particles may be a fumed metal or metalloid (e.g., particles of fumed silica or fumed zinc oxide).

In embodiments where a silanizing agent is employed, the silanizing agent may be a compound of formula (I):

$$R_{4-n}Si—X_n \quad (I)$$

where n is an integer from 1 to 3;
each R is independently selected from
(i) alkyl or cycloalkyl group optionally substituted with one or more fluorine atoms,
(ii) $C_{1\ to\ 20}$ alkyl optionally substituted with one or more substituents independently selected from fluorine atoms and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
(iii) $C_{2\ to\ 8}$ or $C_{6\ to\ 20}$ alkyl ether optionally substituted with one or more substituents independently selected from fluorine and $C_{6\ to\ 14}$ aryl groups, which aryl groups are optionally substituted with one or more independently selected halo, $C_{1\ to\ 10}$ alkyl, $C_{1\ to\ 10}$ haloalkyl, $C_{1\ to\ 10}$ alkoxy, or $C_{1\ to\ 10}$ haloalkoxy substituents,
(iv) $C_{6\ to\ 14}$ aryl, optionally substituted with one or more substituents independently selected from halo or alkoxy, and haloalkoxy substituents,
(v) $C_{4\ to\ 20}$ alkenyl or $C_{4\ to\ 20}$ alkynyl, optionally substituted with one or more substituents independently selected from halo, alkoxy, or haloalkoxy, and
(vi) —Z—$((CF_2)_q(CF_3))_r$, wherein Z is a $C_{1\ to\ 12}$ or a $C_{2\ to\ 8}$ divalent alkane radical or a $C_{2\ to\ 12}$ divalent alkene or alkyne radical, q is an integer from 1 to 12, and r is an integer from 1 to 4;
each X is independently selected from —H, —Cl, —I, —Br, —OH, —$OR^2$, —$NHR^3$, or —$N(R^3)_2$ group;
each $R^2$ is an independently selected $C_{1\ to\ 4}$ alkyl or haloalkyl group; and
each $R^3$ is an independently selected H, $C_{1\ to\ 4}$ alkyl, or haloalkyl group.

In some embodiments, R is an alkyl or fluoroalkyl group having from 6 to 20 carbon atoms.

In other embodiments, R is an alkyl or fluoroalkyl group having from 8 to 20 carbon atoms.

In other embodiments, R is an alkyl or fluoroalkyl group having from 10 to 20 carbon atoms.

In other embodiments, R is an alkyl or fluoroalkyl group having from 6 to 20 carbon atoms and n is 3.

In other embodiments, R is an alkyl or fluoroalkyl group having from 8 to 20 carbon atoms and n is 3.

In other embodiments, R is an alkyl or fluoroalkyl group having from 10 to 20 carbon atoms and n is 3.

In other embodiments, R has the form —Z—$((CF_2)_q(CF_3))_r$, wherein Z is a $C_{1\ to\ 12}$ divalent alkane radical or a $C_{2\ to\ 12}$ divalent alkene or alkyne radical, q is an integer from 1 to 12, and r is an integer from 1 to 4.

In any of the previously mentioned embodiments of compounds of formula (I), the value of n may be varied such that 1, 2 or 3 independently selected terminal functionalities are present. Thus, in some embodiments, n is 3. In other embodiments, n is 2. In still other embodiments, n is 1.

In any of the previously mentioned embodiments of compounds of formula (I), all halogen atoms present in any one or more R groups may be fluorine.

In any of the previously mentioned embodiments of compounds of formula (I), X may be independently selected from —H, —Cl, —$OR^2$, —$NHR^3$, —$N(R^3)_2$, or combinations thereof. In other embodiments, X may be selected from —Cl, —$OR^2$, —$NHR^3$, —$N(R^3)_2$, or combinations thereof. In still other embodiments, X may be selected from —Cl, —$NHR^3$, —$N(R^3)_2$ or combinations thereof.

Any coating described herein may be prepared with one, two, three, four or more compounds of formula (I) employed alone or in combination to modify the nano-particles, and/or other compositions of the coating including filler-particles. The use of silanizing agents of formula (I) to modify nano-particles, or any of the other compositions of the coatings, will introduce one or more $R_{3-n}X_nSi$— groups (e.g., $R_3Si$—, $R_2X_1Si$—, or $RX_2Si$— groups) where R and X are as defined for a compound of formula (I). The value of n is 0, 1, or 2, due to the displacement of at least one "X" substituent and formation of at least one bond between a nano-particle and the Si atom (the bond between the nano-particle and the silicon atom is indicated by a dash "-" (e.g., $R_3Si$—, $R_2X_1Si$—, or $RX_2Si$— groups). More than one "X" can be displaced to form bonds from the Si atom directly or indirectly to the nanoparticle.

In other embodiments, suitable silanizing agents for modifying the nano-particles used in the coating compositions generally comprise those with fluorinated or polyfluorinated alkyl groups (e.g., fluoroalkyl groups) or alkyl groups (hydrocarbon containing groups) including, but not limited to:
(tridecafluoro-1,1,2,2-tetrahydrooctyl)silane (SIT8173.0);
(tridecafluoro-1,1,2,2-tetrahydrooctyl)trichlorosilane (SIT8174.0);
(tridecafluoro-1,1,2,2-tetrahydrooctyl)triethoxysilane (SIT8175.0);

(tridecafluoro-1,1,2,2-tetrahydrooctyl)trimethoxysilane (SIT8176.0);
(heptadecafluoro-1,1,2,2-tetrahydrodecyl)dimethyl(dimethylamino)silane (SIH5840.5);
(heptadecafluoro-1,1,2,2-tetrahydrodecyl)tris(dimethylamino)silane (SIH5841.7);
n-octadecyltrimethoxysilane (SIO6645.0); n-octyltriethoxysilane (SIO6715.0); and
3,3,4,4,5,5,6,6,6-nonafluorohexyldimethyl(dimethylamino)silane (SIN6597.4)
where the designations given in parentheses are the product numbers from Gelest, Inc., Morrisville, Pa.

Another group of reagents that can be employed to prepare first or second particles with hydrophobic and/or oleophobic properties include:
(tridecafluoro-1,1,2,2-tetrahydrooctyl)trichlorosilane;
(tridecafluoro-1,1,2,2-tetrahydrooctyl)triethoxysilane:
nonafluorohexyldimethylchlorosilane;
(tridecafluoro-1,1,2,2-tetrahydrooctyl)trimethoxysilane:
3,3,4,4,5,5,6,6,6-nonafluorohexyldimethyl(dimethylamino)-silane;
nonafluorohexylmethyldichlorosilane;
nonafluorohexyltrichlorosilane;
nonafluorohexyltriethoxysilane; and
nonafluorohexyltrimethoxysilane.

In one embodiment, the coating compositions set forth herein comprise silica second particles treated with nonafluorohexyltrichlorosilane.

In addition to the silanizing agents recited above, a variety of other silanizing agents can be used to alter the properties of second particles and to provide hydrophobic and/or oleophobic properties. In some embodiments, second particles may be treated with an agent selected from dimethyldichlorosilane, hexamethyldisilazane, octyltrimethoxysilane, or tridecafluoro-1,1,2,2-tetrahydrooctyl trichlorosilane. In such embodiments, the second particles may be silica. Silica second particles treated with such agents may have an average size in a range selected from about 1 nm to about 50 nm, from about 1 nm to about 100 nm, from about 1 nm to about 400 nm, from about 1 nm to about 500 nm, from about 2 nm to about 120 nm, from about 5 nm to about 150 nm, from about 5 nm to about 400 nm, from about 10 nm to about 300 nm, from about 20 nm to about 400 nm, or from about 50 nm to about 250 nm.

Other agents can be used to modify second particles, including, but not limited to, one or more of: polydimethylsiloxane, gamma-aminopropyltriethoxysilane, Dynasylan® A (tetraethylorthosilicate), hexamethyldisilazane, and Dynasylan® F 8263 (fluoroalkylsilane), any one or more of which may be used alone or in combination with the silanizing agents recited herein.

Two attributes of silanizing agents that may be considered for the purposes of their reaction with second particles and the introduction of hydrophobic or oleophobic moieties are the leaving group (e.g., X groups of compounds of the formula (I)) and the terminal functionality (e.g., R groups of compounds of the formula (I)). A silanizing agent's leaving group(s) can determine the reactivity of the agent with the first or second particle(s), or other compositions of the coating, if the silanizing agent is applied after a coating has been applied. Where the first or second particles are a silicate or silica (e.g., fumed silica) the leaving group can be displaced to form Si—O—Si bonds. Leaving group effectiveness is ranked in the decreasing order as chloro>methoxy>hydro (H)>ethoxy>trimethoxy>trihydro>triethoxy. This ranking of the leaving groups is consistent with their bond dissociation energy. The terminal functionality determines the level of hydrophobicity that results from application of the silane to the surface.

3.2.1 Some Sources of Second Particles

Second particles such as those comprising fumed silica may be purchased from a variety of suppliers including, but not limited to, Cabot Corp., Billerica, Mass. (e.g., Nanogel TLD201, CAB-O-SIL® TS-720 (silica, pretreated with polydimethylsiloxane), and M5 (untreated silica)) and Evonik Industries, Essen, Germany (e.g., ACEMATT® silica such as untreated HK400, AEROXIDE® silica, AEROXIDE® TiO₂ titanium dioxide, and AEROXIDE® Alu alumina).

Some commercially available second particles are set forth in Table 6 along with their surface treatment by a silanizing agent or polydimethylsiloxane.

TABLE 6

Some commercially available second particles

| Product Name | Surface Treatment | Level of Treatment | Nominal BET Surface Area of Base Product (m²/g) | Particle Size (nm) | Product Source |
|---|---|---|---|---|---|
| M-5 | None | None | 200 | — | Cab-O-Sil |
| Aerosil® 200 | None | None | 200 | 12 | Evonik |
| Aerosil® 255 | None | None | 255 | — | Evonik |
| Aerosil® 300 | None | None | 300 | 7 | Evonik |
| Aerosil® 380 | None | None | 380 | 7 | Evonik |
| HP-60 | None | None | 200 | — | Cab-O-Sil |
| PTG | None | None | 200 | — | Cab-O-Sil |
| H-5 | None | None | 300 | — | Cab-O-Sil |
| HS-5 | None | None | 325 | — | Cab-O-Sil |
| EH-5 | None | None | 385 | — | Cab-O-Sil |
| TS-610 | Dimethyldichlorosilane | Intermediate | 130 | — | Cab-O-Sil |
| TS-530 | Hexamethyldisilazane | High | 320 | — | Cab-O-Sil |
| TS-382 | Octyltrimethoxysilane | High | 200 | — | Cab-O-Sil |
| TS-720 | Polydimethylsiloxane | High | 200 | — | Cab-O-Sil |
| Aerosil® R202 | Polydimethylsiloxane | — | 100 | 14 | Evonik |
| Aerosil® R504 | Hexamethyldisilazane (HMDS) and aminosilane | — | 125-175 | — | Evonik |
| Aerosil® R812S | HMDS based on Aerosil® 300 | — | 220 | — | Evonik |

BET Surface Area is Brunauer, Emmett and Teller surface area

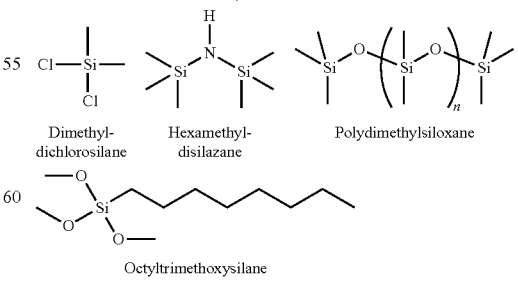

Dimethyldichlorosilane   Hexamethyldisilazane   Polydimethylsiloxane

Octyltrimethoxysilane

As purchased, the particles may be untreated (e.g., M5 silica) and may not possess any HP/OP properties. Such untreated particles can be treated to covalently attach one or more groups or moieties to the particles that give them HP/OP properties, for example, by treatment with the silanizing agents discussed above.

3.3 Dispersants for Second Particles

Second particles can be applied to a base coating after it has been applied to the surface of an object (or a part thereof) in the form of a second composition that comprises one or more independently selected second particles as described above (e.g., second particles having a size of about 1 nm to about 25 µm). In one embodiment the second particles comprise one or more independently selected alkyl, haloalkyl, or perfluoroalkyl moieties bound, either directly or indirectly, to said second particles; wherein said second composition optionally comprises one or more solvents (liquid dispersants).

If the coating has not dried, or has been subjected to a solvent that swells, softens, or otherwise allows the incorporation of second particles into at least the outermost portion of the binder (e.g., renders it sufficiently tacky), second particles may be applied directly to the base coat by contacting the second particles with the base coat. Second particles may be contacted with the surface of the base coat by any suitable means, including spraying them on the surface using a stream of gas (e.g., air, nitrogen, or an inert gas), exposing the binder coating to particles suspended in a gas, or contacting the base coat with a fluidized bed comprising second particles.

Second particles can also be applied to a base coating in a second coating composition that, in addition to the second particles, contains a solvent (dispersant). Where second compositions of the coating composition comprise a solvent, the second particles are dispersed in the solvent for application. Second particles, and particularly smaller second particles (e.g., 1-50 nm or 1-100 nm), may form aggregates or agglomerates in solvents used as dispersants. Where the base coat has not dried, the liquid dispersant acts as a carrier to deposit the second particles on the surface of the base coat. Where the base coating has dried, a liquid dispersant that expands, softens, or swells the outermost portion of the binder (e.g., renders it tacky) permits second particles to become bound in at least the outermost portion of the base coat.

In some embodiments of the application methods recited above, the base coat is treated with the second composition after drying and curing the base coating at room temperature (e.g., about 18° to about 23° C.) or at an elevated temperature (e.g., about 30° to about 100° C., about 30° to about 60° C., about 50° to about 100° C., or about 40° to about 90° C.). In other embodiments, the solvent used to apply the base coat is allowed to evaporate until the coating is no longer liquid and cannot be removed by contact (i.e., dry to the touch); however, the base coating is not fully dried and cured when treated with the second composition containing second particles. In still other embodiments, the composition comprising second particles may be applied directly to the base coat before any solvents used in the application of the base coating have fully, substantially, or partly evaporated.

Suitable solvents include those with a surface energy lower than water including, but not limited to: alcohols, ketones, acetone, methyl ethyl ketone (MEK), ethyl acetate, toluene, xylene, isopropyl acetate, 1,1,1,-trichloroethane, methyl isobutyl ketone (MIBK), tert-butyl acetate (t-butyl acetate), cyclohexane, methyl-cyclohexane, or mixtures comprising any two, three, four or more thereof. In an embodiment, the solvents are non-aqueous (e.g., they contain less than 10%, 5%, 4%, 3%, 2%, 1%, or 0.5% of water by weight or they contain only insubstantial amounts of water). Solvents that are miscible with water are employed in the second coating composition in another embodiment. In another embodiment, the solvent comprises a non-aqueous water miscible solvent. In one embodiment, the solvent employed in the second coating composition is acetone or is comprised of acetone. In another embodiment the solvent employed in the second coating composition is NMP (N-methylpyrrolidone) or is comprised of NMP. In other embodiments, the solvent employed in the second coating composition comprises a mixture of acetone or NMP with water, particularly a minor proportion of water (e.g., less than about 5%, less than about 4%, less than about 2%, less than about 1%, or less than about 0.5% water).

In one embodiment, the second composition of the coating composition (i.e., the top coat) comprises:
  i) one or more independently selected second particles having a size of about 1 nm to about 25 µm, wherein said second particles comprise one or more independently selected alkyl, haloalkyl, or perfluoroalkyl moieties bound, either directly or indirectly, to said second particles; and
  ii) optionally, one or more independently selected solvents, wherein when said one or more solvents are present, said second particles may be present in a weight percent range selected from 0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5, based on the weight of the one or more solvents and second particles.

In another embodiment, the second composition comprises:
  (i) 0.1 to 3.5 parts by weight (e.g., 0.1-1, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of second particles that comprise one or more independently selected alkyl, haloalkyl, or perfluoroalkyl moieties bound, either directly or indirectly, to said second particles, or one or more siloxanes or silazanes associated with the second particles;
  (ii) a fluorinated polyolefin, (e.g., a polymer of tetrafluoroethylene, hexafluoropropylene and/or vinylidene fluoride, such as Dyneon™ THV); and/or a Fluoroethylene-Alkyl Vinyl Ether (FEVE) copolymer; and
  (iii) a solvent for the remainder of a total of 100 parts by weight.

In another embodiment, the fluorinated polyolefin (e.g., a polymer of tetrafluoroethylene, hexafluoropropylene and vinylidene fluoride, such as Dyneon™ THV), if present, comprises from 0.1 to 1.0 parts by weight (e.g., 0.1-0.5, 0.5-1.0, or 0.3-0.7 parts) of the composition.

In another embodiment, the Fluoroethylene-Alkyl Vinyl Ether (e.g., the constituent polymer found in Lumiflon™), if present, comprises 0.06 to 0.6 parts by weight (e.g., 0.06-0.1, 0.1-0.2, 0.2-0.4, or 0.4-0.6 parts) of the composition. In such an embodiment the FEVE may have an average molecular weight of about 1,000 to about 3,000 Daltons (e.g., about 1,000-2,000, 2,000-3,000, 1,500-2,500, or about 1,000, about 1,500, about 2,000, about 2,500, or about 3,000 Daltons). Accordingly, one embodiment of the second composition comprises in 100 parts by weight (per 100 parts by weight):
  i) 0.1 to 3.5 parts by weight (e.g., 0.1-1.0, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of one or more independently selected second particles having a size of about 1 nm to about 25 µm, wherein said second particles comprise one or more independently selected alkyl, haloalkyl, or perfluoroalkyl moieties bound, either directly or indirectly, to said second particles, or one or more siloxanes or silazanes associated with said second particles;

ii) 0.1 to 1.0 parts by weight (e.g., 0.1-0.5, 0.5-1.0, or 0.3-0.7 parts) of a fluorinated polyolefin, (e.g., a polymer of tetrafluoroethylene, hexafluoropropylene and vinylidene fluoride, such as Dyneon™ THV); and/or 0.06 to 0.6 parts by weight (e.g., 0.06-0.1, 0.1-0.2, 0.2-0.4, or 0.4-0.6 parts) of a FEVE copolymer, having an average molecular weight of about 1,000 to about 3,000 Daltons (e.g., about 1,000-2,000, 2,000-3,000, 1,500-2,500, or about 1,000, about 1,500, about 2,000, about 2,500, or about 3,000 Daltons); and (iii) one or more solvents for the remainder of a total of 100 parts by weight.

Where the solvent employed in second coating compositions swells, softens, or otherwise renders at least the outermost layer of a binder "tacky," second particles can be introduced into completely dried and cured base coats. That permits the repair of worn or abraded coatings that have lost HP/OP behavior over all or part of their surface.

4.0 Surface Preparation and Priming

To improve the adherence and performance of the coatings described herein the surface to be coated, in whole or in part, should be clean, free of contaminants and capable of supporting the coatings (e.g., not friable). Primers not only promote bonding of the HP/OP coating to substrate surfaces such as metals, but also act to provide continued adhesion to the base coat under a variety of conditions; such as by compensating for differences in the coefficient of thermal expansion between the HP/OP coating and the substrate. Performance of the coatings in terms of their durability may also be improved by the application of a primer.

Any primer compatible with both the surface of the object and the base coating can be employed. In one embodiment the primers comprise one or more epoxy functional primer coating materials. In another embodiment, described more fully below, the primer is a polyurethane primer. Where metal surfaces are to be coated, and particularly the surface of ferrous metals, aluminum, or aluminum alloys, it may be advantageous to use a self-etching primer comprising rust-inhibitory materials (e.g., zinc/phosphate primers) as a primer or as an undercoating upon which a primer such as an epoxy or polyurethane primer is applied. Any of the above-mentioned primers may be one-part or two-part primer compositions. One function of the primers is to provide good adhesion to many metal surfaces as well as wood, plastic and ceramic substrates. Other functions are to provide surface texture to the top coat and to minimize the impact of differences in thermal expansion of the coatings and the substrates, thereby to prevent cracking, pealing, and chipping of the coatings at different temperatures.

In other embodiments, primers comprise polyurethane polymers. Such polyurethane containing primers ("polyurethane primers") demonstrate excellent bonding to many substrates including metallic substrates. When employing a polyurethane primer, it is possible to incorporate first particles into the primer and/or the base coat (e.g., a base coat with or without first particles applied over a primer coat with first particles) for texture development. Thus, in addition to promoting adhesion, the primer can also serve to develop texture with increased surface area for improved adhesion of the base coat, wear resistance, and hydrophobicity/oleophobicity.

HP/OP coatings applied over primers display improved resistance to the loss of hydrophobicity in Taber Abraser wear/abrasion resistance tests (as measured by Taber Abraser cycles) when abrasive (CS-10) and soft (CS-0) wheels are employed relative to coatings that are applied in the absence of the primers.

In any of the foregoing embodiments the primers may also comprise colorants. Colorants may be present in insubstantial amounts (e.g., less than about 3% by weight of the polymers present in the binder, such as less than 2.0%, 1.0%, 0.75%, 0.5%, 0.25%, or 0.1%).

In any of the foregoing embodiments the primers may comprise first particles for texture development in the primer, the base coat (i.e., base coat with or without first particles), and/or the HP/OP coating.

5.0 Coating Application Method

The coatings described herein (including any underlying primer) can be applied to surfaces using any means known in the art including, but not limited to, brushing, painting, printing, stamping, rolling, dipping, spin-coating, spraying, or electrostatic spraying. In one embodiment, one or more of a primer, base coat and/or top coat are applied by spraying. In another embodiment, each of a primer (if present), base coat and top coat are applied by spraying.

In one embodiment the first and second coating compositions described herein are separately prepackaged in a delivery system/apparatus for spray applications, such as aerosol canisters (e.g., pre-pressurized aerosol cans). In such an embodiment, the first composition and second composition can be packaged in separate delivery systems/apparatus. A propellant is added to the system/apparatus that serves to drive the compositions out of their canisters for delivery. Propellants will typically be a gas at 25° C. and 1 atmosphere, but may be in a different phase (liquid) under pressure, such as in a pressurized aerosol delivery system. The propellant may be a gas (e.g., air or nitrogen) or a liquefiable gas having a vapor pressure sufficient to propel and aerosolize the first and/or second compositions as they exit their delivery system/apparatus). Some exemplary propellants include: liquefied petroleum gases, ethers (e.g., dimethyl ether (DME) and diethyl ether); C1-C4 saturated hydrocarbons (e.g., methane, ethane, propane, n-butane, and isobutene); hydrofluorocarbons (HFC) (e.g., 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a)), and mixtures comprising any two, three or more of the foregoing. In another embodiment, the propellant is a blend of n-butane and propane.

Generally, the surfaces will be rigid or semi-rigid, but the surfaces can also be flexible, for example in the instance of wires, tapes, rubberized materials, gaskets, and ribbons.

The coatings described herein can be applied to virtually any substrate to provide HP/OP properties. The choice of coatings and coating processes that will be used may be affected by the compatibility of the substrate and its surface to the coating process and the composition of the coating compositions. Among the considerations are the compatibility of the substrate and its surface with any solvents that may be employed in the application of the coatings and the ability of a desired coating to adhere to the substrate's surface.

Coatings may take any desired shape or form, limited only by the manner and patterns in which they can be applied. In some embodiments, the coating will completely cover a surface. In other embodiments the coating will cover only a portion of a surface, such as one or more of a top, side or bottom of an object. In one embodiment, a coating is applied as a line or strip on a substantially flat or planar surface. In such an embodiment the line or strip may form a spill-resistant border.

The shape, dimensions and placement of HP/OP coatings on surfaces can be controlled by a variety of means including the use of masks, which can control not only the portions of a surface that will receive a coating, but also the portions of a surface that may receive prior treatments such as the application of a primer layer or cleaning by abrasion or solvents. For example, where sandblasting or a chemical treatment is used to prepare a portion of a surface for coating, a mask resistant to those treatments would be selected (e.g., a mask such as a rigid or flexible plastic, resin, or rubber/rubberized material). Masking may be attached to the surface through the use of adhesives, which may be applied to the mask agent, the surface, or both.

In another embodiment HP/OP coatings are applied to a ribbon, tape or sheet that may then be applied to a substrate by any suitable means including adhesive applied to the substrate, the ribbon or tape, or both. Ribbons, tapes and sheets bearing a superhydrophobic coating may be employed in a variety of applications, including forming spill proof barriers on surfaces. Ribbons, tapes, and sheets are generally formed of a substantially flat (planar) flexible material where one side (the top) is made hydrophobic or superhydrophobic. This includes metal sheets, ribbons, and tapes such as aluminum tape or other tapes (e.g., metal adhesive tape, plastic adhesive tape, paper adhesive tape, fiberglass adhesive tape), wherein one side is coated with an HP/OP coating and adhesive is applied to the other side. Once such HP/OP ribbons, tapes, and sheets are prepared, they can be applied to any type of surface including metal, ceramic, glass, concrete, masonry, stone, plastic/polymer, or wood surfaces, for a variety of purposes.

In one embodiment, a method of applying a HP/OP coating to a substrate comprises the steps of:
a) applying to the substrate a first composition that provides a base coat, the first composition comprising:
i) one or more polyisocyanates and one or more polyalcohols that react to form a polyurethane, wherein said polyols have a molecular weight from about 400 to about 10,000 Daltons (e.g., 500-6,000 Daltons) and an average molar hydroxyl functionality from about 2.0 to about 2.5,
ii) optionally one or more independently selected first particles having a size of about 30 µm to about 225 µm, wherein, when said first particles are present, the first composition comprises from about 0.01% to about 5% of said first particles by weight (e.g., about 0.01% to about 5%, about 0.03% to about 1%, about 0.05% to about 0.15%, about 0.1% to about 2.5%, or about 0.2% to about 5% of said first particles by weight), and
iii) also optionally, comprising one or more independently selected solvents; and
b) applying to the base coat a second composition comprising second particles (e.g., second particles having a size of about 1 nm to 25 µm), where the second particles are associated with one or more hydrophobic and/or oleophobic moieties (e.g., bound directly or indirectly, including covalently or non-covalently, to the particles), wherein the second composition optionally comprises an agent to suspend or assist in suspending the particles (e.g., a solvent such as hexane, acetone or tert-butyl acetate).

In another embodiment, a method of applying a HP/OP coating to a substrate comprises the steps of:
a) applying to the substrate a first composition that provides a base coat, the first composition comprising:
i) one or more polyisocyanates and one or more polyalcohols that react to form a polyurethane, wherein said polyols have a molecular weight from about 400 to about 10,000 Daltons (e.g., 500-6,000 Daltons) and an average molar hydroxyl functionality from about 2.0 to about 2.5,
ii) the first composition optionally comprising, one or more independently selected first particles having a size of about 30 µm to about 225 µm, wherein, when said first particles are present, the first composition comprises from about 0.01% to about 5% of said first particles by weight (e.g., about 0.01% to about 5%, about 0.03% to about 1%, about 0.05% to about 0.15%, about 0.1% to about 2.5%, or about 0.2% to about 5% of said first particles by weight), and
iii) the first composition also optionally comprising one or more independently selected solvents; and
b) applying to the base coat a second composition that comprises per 100 parts by weight
i) 0.1 to 3.5 parts by weight (e.g., 0.1-1.0, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of one or more independently selected second particles having a size of about 1 nm to about 25 µm, wherein said second particles comprise one or more independently selected hydrophobic or oleophobic moieties (e.g., alkyl, haloalkyl, or perfluoroalkyl moieties) bound, either directly or indirectly, to said second particles, or one or more siloxanes or silazanes associated with said second particles,
ii) 0.1 to 1.0 parts by weight (e.g., 0.1-0.5, 0.5-1.0, or 0.3-0.7 parts) of a fluorinated polyolefin (e.g., a polymer of tetrafluoroethylene, hexafluoropropylene and/or vinylidene fluoride, such as Dyneon™ THV), and/or
0.06 to 0.6 parts by weight (e.g., 0.06-0.1, 0.1-0.2, 0.2-0.4, or 0.4-0.6 parts) of a Huoroethylene-Alkyl Vinyl Ether (FEVE) copolymer, having an average molecular weight of about 1,000 to about 3,000 Daltons (e.g., about 1,000-2,000, 2,000-3,000, 1,500-2,500, or about 1,000, 1,500, 2,000, 2,500, or 3,000 Daltons), and
iii) one or more independently selected solvents for the remainder of a total of 100 parts by weight.

In such embodiments, the first composition may comprise a one-component (1K) or two-component (2K) polyurethane forming composition that provides the base coat.

First composition and second compositions may be applied using one or more methods selected independently from brushing, painting, printing, stamping, rolling, dipping, spin-coating, curtain coating, or spraying. In one embodiment, such a process comprises at least two steps (e.g., a two-step process of applying the first and second compositions), and may include additional steps, such as a second application of the second composition, making it a three or more step process.

In an embodiment, one or both of the first and second compositions are applied to a surface by spraying in a method comprising:
(a) spraying a first composition (e.g., binder and first particles) on all or part of the surface of an object; followed by
(b) spraying a second composition (e.g., second particles and optionally a solvent) on all or part of the surface of an object to which said first composition was applied. In one embodiment, the spraying may be conducted using first, second, or both compositions packaged in aerosol spray canisters. In such an embodiment, one aerosol spray canister contains a moisture cure polyurethane and/or a latent polyurethane (e.g., a polyurethane that has a latent catalyst and/or a latent (blocked) polyisocyanate, either or both of which may be activated by heat)); and the other spray canister contains the second composition.

In an embodiment of the above-described coating process, a base coat of polyurethane binder and first particles (e.g., EXPANCEL particles) is applied as the first composition. Once the base coat loses sufficient solvent so that it: does not run when a second composition is applied; is close to being dry to touch (e.g., is tacky); becomes dry to touch; or is dry, a second coating composition (e.g., second particles and an optional dispersant such as hexane or acetone) is applied. The solvent in the dispersant helps attach the functional second particles to the binder of the base coat. The polyurethanes are then allowed to cure and heated as necessary to improve the curing time.

In any of the above-mentioned methods, and the compositions they employ, the polyurethane polymers may be moisture or heat cure compositions. Accordingly, the application methods may include steps of drying/curing the article by exposure to moisture, oxygen, and/or heat depending on the specific polyurethane composition employed. The drying/curing may take place either after application of the first composition to form a base coat after which the second composition is applied, after application of the first and second compositions, or both.

The polyurethane coating obtained is durable, delivers HP/OP behavior, can be applied to a variety of substrates including metals, ceramics, polymers, and fabrics, and finds use in a number of specific applications as set forth below.

6.0 Applications

The coating described herein may be employed in a variety of applications including, but not limited to, coatings for all or part of:

1) electronic equipment and their electronic compositions or subassemblies (e.g., circuit boards), including, but not limited to: cell phones, laptop computers, electronic tablets (e.g., iPads), cameras, video games, Global Positioning System (GPS) devices, radios, MP3 and electronic music players, watches, video equipment, security systems, satellite dishes and other portable electronics;
2) shoes (e.g., athletic shoes, casual shoes, dress shoes) and apparel for medical and recreational use;
3) toys such as toy vehicles (e.g., trucks, cars), bikes, scooters, playground equipment (e.g., swings, slides, teeter-totters), water toys, and toys for use in bathtubs;
4) cleaning products such as toilet brushes, toilet plungers, mops, and dust mops and cloths;
5) furniture and cooking preparation and serving surfaces including both indoor and outdoor furniture (e.g., lawn/patio furniture and park furniture such as tables, chairs and benches), or applied to furniture as a spill resistant borders on surfaces that are substantially horizontal;
6) pet products, e.g., litter boxes, litter scoopers, drinking and food bowls, collars, litter particles, and animal beds;
7) farm tools and home and garden tools including shovels, spades, and rakes;
8) outdoor and exercise equipment (e.g., skis, snow boards), in-line skates, roller skates;
9) appliances including portions of or entire refrigerator plates (e.g., spill proof borders), freezer liners, parts in washing machines, dishwashers, dehumidifiers, humidifiers, and dryers;
11) baby/toddler products (e.g., car seats, potty seats, bibs, silverware (made from plastics), cups, plates and diapers (or parts thereof));
12) food and beverage containers (e.g., bottles and containers for beverages, water, food);
13) sports equipment including balls (e.g., baseballs, tennis balls, footballs, soccer balls), gloves, backpacks, and tents;
14) bedding (sheets, mattresses, pillows, and blankets);
15) food processing equipment and kitchen equipment including coatings and/or spill resistant borders for counters, backsplashes, the walls behind counters where food is prepared, and abattoirs (e.g., wall coatings and/or curtains used to section off a slaughter floor);
16) superhydrophobic body spray;
17) automotive parts (e.g., bumpers, internal plastic parts, engine parts, structural parts, fender well (wheel well) liners, and car seats, particularly for convertibles));
18) protective equipment (e.g., helmets, pads, and uniforms);
19) building products (e.g., rain spouts, doors, counters (polymer), flooring, ceilings, screens, and roofing);
20) laboratory equipment (e.g., trays, storage bins, tools, petri dishes, funnels, tubing and animal cages);
21) electrical equipment (e.g., electrical housings, electrical wiring, motors, switches, insulators, and circuit boards);
22) communications equipment (e.g., satellite dishes, antennas, and communications towers);
23) plastic and/or metal tubing and piping (e.g., PVC piping, copper piping, plastic and steel piping);
24) lavatory/bathroom equipment and fixtures (e.g., urinals, toilets, toilet seats, air and/or heat hand drying equipment, potty seat bowls, counters, sinks, and soap dispensers);
25) medical products including: beds and bed parts, bed pans, tubing, tubular products, catheters, stents, surgical tools and operating room equipment (such as robotic surgical tools, tables and light fixtures), walls, floors, sinks, imaging equipment/machinery, laboratory testing equipment/machinery, and medical instruments (e.g., medical instruments used in surgical and nonsurgical applications);
26) wound care products, such as spray-on bandages, regular bandages, and body affecting products (e.g., skin and/or hair spray); and
27) aviation and boating equipment (e.g., airplane fuselage, wings and instrumentation), and boat bottoms, decks, and other places throughout a boat.

Use of the coating can be facilitated by providing the first and second compositions for preparing the coatings described herein in a form that permits facile application. In one embodiment the first and/or second compositions are prepackaged in solvent or propellant delivery systems such as aerosol canisters (e.g., aerosol cans).

7.0 Coating Evaluation

Coatings prepared using the polyurethane binder forming first composition and second coating composition described herein can be evaluated using one or more criteria including, but not limited to:

1. transparency and appearance, which are evaluated both quantitatively and qualitatively;
2. durability of the SH/OP behavior (wear resistance of the coating) to an applied force using:

2a. semi-quantitative glove rub test in which the thumb of a latex rubber gloved hand is stroked by hand over the surface of the coating that has been applied to a substantially planar surface until the coating no longer shows superhydrophobic behavior. This test is a proxy for the ability of the surface to be handled and retain its HP/OP properties. During the test, the area of the surface contacted with the rubber glove is approximately 25 mm×25 mm and the force applied approximately 300 g (or about 0.5 g/square mm). The end of superhydrophobic behavior is judged by the failure of more than half of the water droplets applied (typically 20) to the tested surface to run (roll) off when the surface is inclined at 5 degrees from horizontal.

2b. loss of superhydrophobic behavior can also be judged after the surface is subject to the action of a cylindrical rubber finger moved across the surface. The finger is rubbed across the surface using a motorized American Association of Textile Chemists and Colorists (AATCC) CM-5 Crockmeter fitted with a 14/20 white rubber septum (outside diameter of 13 mm and inside diameter of 7 mm with a contact surface area of 94 $mm^2$) to contact the coating with a force of 9 Newtons (Ace Glass, Inc., Vineland, N.J., Catalog No. 9096-244). The end of superhydrophobic behavior is judged by the failure of more than half of the water droplets applied to the tested surface (typically 20 droplets) to run (roll) off when the surface is inclined at 5 degrees from horizontal, 2c. loss of superhydrophobic behavior when the samples are subject to Taber Abraser testing using CS-10 (abrasive) and/or CS-0 (non-abrasive) wheels at the indicated loads and speeds to determine the point at which the surfaces lose superhydrophobicity. Unless indicated otherwise, a load of 1,000 g is employed. All Taber tests were conducted at a speed of 95 rpm unless stated otherwise. The end of superhydrophobic behavior is judged by the failure of more than half of the water droplets applied to the tested surface (typically 20) to run (roll) off when the surface is inclined at 5 degrees from horizontal, 2d. time to the loss of superhydrophobicity under a shower of water. Water is applied from a showerhead placed 152.4 cm (60 inches) above a substantially planar test surface inclined at 5 degrees from the horizontal, the showerhead having 70 nozzles with a 1 mm diameter orifice arranged in 5 spokes of 5 nozzles and 15 spokes of 3 nozzles about a central point on the circular showerhead. The apparatus delivers a shower of 6 liters of water per minute using about 137,900 to about 310,275 Pascals (about. 20 to about 45 psi) over an approximately circular area of about 150 cm in diameter at the level of the test surface. The time to loss of superhydrophobic behavior is determined to be the period of time after which water droplets from the shower begin to "stick" to the surface (no longer freely run off the surface) of a sample placed in the shower. FIG. 1 shows an exemplary testing apparatus used to determine the end of SH/OP behavior in a shower test.

3. coating thickness and/or surface roughness, expressed as the average roughness (Ra) unless stated otherwise. Surface roughness has been found to be an indicator that positively correlates with abrasion resistance (increasing abrasion resistance with increasing roughness);

4. the ability of coated surfaces to resist ice formation in dynamic testing and the adherence of ice to surfaces;

5. electrical properties including resistance and permittivity.

6. oleophobicity, either by using the contact angle of light mineral oil with the coating or by assessing the interaction of droplets of various liquid hydrocarbons having different surface tensions employed in the AATCC 118-1997 Oil Repellency test with the coating surface. For testing, a coating is applied to a 4×4 inch substantially planar plate. After the plate has dried and cured it is placed on a 5±1 degree slope relative to the horizontal and five droplets of a test hydrocarbon are applied beginning with Kaydol™ (available from CBM Group of N.C. inc., 1308 N. Ellis Ave., Dunn N.C. 28334). When droplets stick to the coating or wet the coating, the Score (Oil Repellency Grade Number) is assigned. Thus, Kaydol™ droplets rolling off earns a value of 1 or greater, 65:35 Kaydol™:n-hexadecane droplets rolling off earns a value of 2 or greater, and so on. All test are conducted at room temperature.

| Score (Oil Repellency Grade Number) | hydrocarbon |
| --- | --- |
| 0 | None (Fails Kaydol ™) |
| 1 | Kaydol ™ (mineral oil) |
| 2 | 65:35 Kaydol ™:n-hexadecane |
| 3 | n-hexadecane |
| 4 | n-tetradecane |
| 6 | n•dodecane |
| 6 | n-decane |
| 7 | n-octane |
| 8 | n-heptane |

The oleophobicity of first or second particles (e.g., fumed silica treated with a silane, silazane, silanol, siloxane, fluorinated versions thereof, etc.) can be tested in the same manner. In such tests the first and/or second particles are applied to a clean 4×4 inch aluminum plate by spraying a suspension containing 2% particles 98% acetone by weight to form a coating of particles that covers the aluminum plate. After the plate has dried, the above-listed hydrocarbon liquids are tested on the particle coatings in the same manner as they would be on a polyurethane coating, and the particles scored in the same manner.

8.0 Certain Embodiments

1. A product having a combination of separate compositions for forming a coating (e.g., a combination of separate compositions for forming a coating or, alternatively, a system for forming a coating, the system comprising as separate components a first composition and a second composition) comprising:
   a) a first composition which comprises
      i) one or more polyisocyanates and one or more polyalcohols that react to form a polyurethane, wherein said polyols have a molecular weight from about 150 to about 10,000 Daltons (e.g., 500-6,000 Daltons) and an average molar hydroxyl functionality from about 2.0 to about 2.5,
      ii) the first composition optionally comprising, one or more independently selected first particles having a size of about 30 μm to about 225 μm, wherein, when said first particles are present, the first composition comprises from about 0.01% to about 5% of said first particles by weight (e.g., about 0.01% to about 5%, about 0.03% to about 1%, about 0.05% to about 0.15%, about 0.1% to about 2.5%, or about 0.2% to about 5% of said first particles by weight), and
      iii) the first composition also optionally comprising one or more independently selected solvents; and b) a second composition which comprises
   i) one or more independently selected second particles having a size of about 1 nm to about 25 µm, wherein said second particles comprise one or more independently selected hydrophobic and/or oleophobic moieties bound, either directly or indirectly, to said second particles, and
   ii) optionally, one or more independently selected solvents, wherein when said one or more solvents are present, said second particles may be present in a weight percent range selected from 0.1-1.0, 1.0-2.0, 0.2-2.0, 0.5-1.5, 0.5-2.0, 0.75-2.5, 1.5-2.0, 1.5-2.5, 2.0-3.0, 2.0-3.5, 2.5-3.5, 3.5-4.0 and 4.0-5.0, based on the weight of the one or more solvents and second particles.

2. A product having a combination of separate compositions for forming a coating (e.g., a combination of separate compositions for forming a coating or, alternatively, a system for forming a coating, the system comprising as separate components a first composition and a second composition) comprising:
   A) a first composition which comprises:
      i) one or more polyisocyanates and one or more polyalcohols that react to form a polyurethane, wherein said polyols have a molecular weight from about 150 to about 10,000 Daltons (e.g., 500-6,000 Daltons) and an average molar hydroxyl functionality from about 2.0 to about 2.5;
      ii) the first composition optionally, one or more independently selected first particles having a size of about 30 µm to about 225 µm, wherein, when said first particles are present, the first composition comprises from about 0.01% to about 5% of said first particles by weight (e.g., about 0.01% to about 5%, about 0.03% to about 1%, about 0.05% to about 0.15%, about 0.1% to about 2.5%, or about 0.2% to about 5% of said first particles by weight); and
      iii) the first composition further optionally, one or more independently selected solvents; and
   B) a second composition which comprises per 100 parts by weight:
      i) 0.1 to 3.5 parts by weight (e.g., 0.1-1.0, 1.0-2.0, 0.2-2.0, 0.5-1.5, 0.5-2.0, 0.75-2.5, 1.5-2.0, 1.5-2.5, 2.0-3.0, 2.0-3.5, or 2.5-3.5) of one or more independently selected second particles having a size of about 1 nm to about 25 µm, wherein said second particles comprise one or more independently selected hydrophobic or oleophobic moieties (e.g., alkyl, haloalkyl, or perfluoroalkyl moieties) bound, either directly or indirectly, to said second particles, or one or more siloxanes or silazanes associated with said second particles;
      ii) 0.1 to 1.0 parts by weight (e.g., 0.1-0.5, 0.5-1.0, or 0.3-0.7 parts) of polymer or components that react to form a polymer (e.g., any one or more of a polyacrylate, polyurethane, polyester, polyamide, polyolefin, or fluorinated polyolefin, (e.g., a polymer of tetrafluoroethylene, hexafluoropropylene and/or vinylidene fluoride, such as Dyneon™ THV)); and/or
         0.06 to 0.6 parts by weight (e.g., 0.06-0.1, 0.1-0.2, 0.2-0.4, or 0.4-0.6 parts) of a Huoroethylene-Alkyl Vinyl Ether (FEVE) copolymer, having an average molecular weight of about 1,000 to about 3,000 Daltons (e.g., about 1,000-2,000, 2,000-3,000, 1,500-2,500, or about 1,000, 1,500, 2,000, 2,500, or 3,000 Daltons);
      and
      iii) one or more independently selected solvents for the remainder of a total of 100 parts by weight.

3. The product of any preceding embodiment, wherein at least a portion of said one or more polyisocyanates and one or more polyalcohols are present as partial reaction products comprising at least one urethane group.

4. The product of any preceding embodiment, wherein said polyalcohol comprises one or more hydroxyl bearing polyether, polyester, polyamide, and/or polyacrylate polymers.

5. The product of any preceding embodiment wherein said one or more polyalcohols is a single type of polyalcohol that comprises 0, 1, 2, or 3 terminal hydroxyl groups per molecule, or a mixture of two or more polyalcohols that comprise 0-1, 1-2, or 2-3 terminal hydroxyl functionalities.

6. The product according to embodiment 4 or 5, wherein said polyalcohol comprises monomers with a molecular weight in a range selected from 60-150 g/mole (e.g., 60-100, 60-120, 80-120, 80-140, 100-140 and/or 120-160 g/mole).

7. The product of any preceding claim, wherein said polyisocyanate is one or more aliphatic polyisocyanates and/or one or more aromatic polyisocyanates.

8. The product of any preceding embodiment, wherein said polyisocyanate comprises one or more aliphatic polyisocyanates having an average isocyanate functionality from about 2 to about 3 (e.g., 2.0, 3.0, 2.0-2.05, 2.05-2.1, 2.1-2.2, 2.2-2.3, 2.3-2.4, 2.4-2.5, 2.5-2.6, 2.6-2.7, 2.7-2.8, 2.8-2.9, 2.9-3.0, 2.0-2.5 or 2.5-3.0).

9. The product of any preceding embodiment, wherein said aliphatic isocyanate comprises one or more of hexamethylene diisocyanate, and/or isophorone diisocyanate.

10. The product of any preceding embodiment, wherein said polyisocyanate comprises one or more aromatic polyisocyanates having an average isocyanate functionality from about 2 to about 3 (e.g., 2.0, 3.0, 2.0-2.05, 2.05-2.1, 2.1-2.2, 2.2-2.3, 2.3-2.4, 2.4-2.5, 2.5-2.6, 2.6-2.7, 2.7-2.8, 2.8-2.9, 2.9-3.0, 2.0-2.5 or 2.5-3.0).

11. The product of any preceding embodiment, wherein said aromatic isocyanate comprises one or more of naphthalene diisocyanate (NDI), Methylene Diphenyl Diisocyanate, (MDI e.g., any one or more of 2,2'-MDI, 2,4'-MDI, and 4,4'-MDI), and/or Toluene Diisocyanate (TDI).

12. The product of embodiment 11, wherein said TDI is greater than 98% 2,4-TDI, greater than 98% 2,6-TDI, or a mixture of TDI isomers (e.g., 80/20 and 65/35 mixtures of the 2,4 and 2,6 isomers).

13. The product of any preceding embodiment, wherein said first composition further comprises one or more colorants, UV stabilizers, antioxidants, rheological agents, and/or fillers.

14. The product of any preceding embodiment, wherein said second composition further comprises one or more colorants, UV stabilizers, and/or antioxidants.

15. The product of any preceding embodiment, wherein said first composition comprises one, two, three, or more polyisocyanates.

16. The product of any preceding embodiment, wherein said first composition comprises one, two, three, or more polyalcohols.

17. The product of any preceding embodiment, wherein said first particles are selected from the group consisting of: glass, ceramic, rubber, plastic, thermoplastic, wood, cellulose, metal oxides, silicon dioxide, silicates, tectosilicates, germanium dioxide, plastic particles, carbide particles, nitride particles, boride particles (e.g., zirconium or titanium boride), spinel particles, diamond particles, fly ash particles, fibers and hollow glass spheres, hollow glass particles or hollow plastic particles (e.g., glass, polymer, plastic or thermoplastic particles, spheres, or microspheres), wherein said first particles optionally comprise a colorant (e.g., colored or pigmented glass particles, plastic particles, rubber particles, hollow glass or hollow plastic particles).

18. The product of any preceding embodiment, wherein said first particles comprise hollow glass or plastic particles (e.g., glass, polymer, plastic or thermoplastic particles or microspheres), and wherein said first particles optionally comprise a colorant.

19. The product of any preceding embodiment, wherein said first particles have a size (average diameter) selected from 5 to 50 μm, from 6 to 45 μm, from 5 to 20 μm, from 20 to 35 μm, and from 35 to 50 μm.

20. The product of any preceding embodiment wherein the second particles have an average size (average diameter) in a range selected from the group consisting of from: about 1 nm to about 100 nm; about 10 nm to about 200 nm; about 20 nm to about 400 nm; about 10 nm to about 500 nm; about 40 nm to about 800 nm; about 100 nm to about 1 μm; about 200 nm to about 1.5 μm; about 500 nm to about 2 μm; about 500 nm to about 2.5 μm; about 1 μm to about 10 μm; about 2 μm to about 20 μm; about 2.5 μm to about 25 μm; about 500 nm to about 25 μm; about 400 nm to about 20 μm; and about 100 nm to about 15 μm.

21. The product of any preceding embodiment, wherein said second particles comprise a metal oxide, an oxide of a metalloid (e.g., silica), a silicate, or a glass.

22. The product according to any preceding embodiment, wherein said second particles are comprised of silica and have an average size in a range selected from: about 1 nm to about 50 nm; about 1 nm to about 100 nm; about 1 nm to about 400 nm; about 1 nm to about 500 nm; about 2 nm to about 120 nm; about 2 nm to about 200 nm, about 5 nm to about 150 nm; about 5 nm to about 400 nm; about 10 nm to about 300 nm; or about 20 nm to about 400 nm.

23. The product of any preceding embodiment, wherein said second particles comprise one or more fluorinated hydrophobic and/or oleophobic moieties.

24. The product of any preceding embodiment, wherein said second particles comprise one or more alkyl, fluoroalkyl, and/or perfluoroalkyl moieties that are covalently or non-covalently bound directly or indirectly through one or more atoms to other components of the second particles (e.g., fumed silica).

25. The product according to any preceding embodiment, wherein said one or more hydrophobic or oleophobic moieties result from contacting the second particles with one or more silanizing agents, e.g. a silanizing agent of formula (I):

where n is an integer from 1 to 3;
each R is independently selected from
(i) alkyl or cycloalkyl group optionally substituted with one or more fluorine atoms,
(ii) $C_{1 \text{ to } 20}$ alkyl optionally substituted with one or more substituents independently selected from fluorine atoms and $C_{6 \text{ to } 14}$ aryl groups, which aryl groups are optionally substituted with one or more independently selected halo, $C_{1 \text{ to } 10}$ alkyl, $C_{1 \text{ to } 10}$ haloalkyl, $C_{1 \text{ to } 10}$ alkoxy, or $C_{1 \text{ to } 10}$ haloalkoxy substituents,
(iii) $C_{2 \text{ to } 8}$ or $C_{6 \text{ to } 20}$ alkyl ether optionally substituted with one or more substituents independently selected from fluorine and $C_{6 \text{ to } 14}$ aryl groups, which aryl groups are optionally substituted with one or more independently selected halo, $C_{1 \text{ to } 10}$ alkyl, $C_{1 \text{ to } 10}$ haloalkyl, $C_{1 \text{ to } 10}$ alkoxy, or $C_{1 \text{ to } 10}$ haloalkoxy substituents,
(iv) $C_{6 \text{ to } 14}$ aryl, optionally substituted with one or more substituents independently selected from halo or alkoxy, and haloalkoxy substituents,
(v) $C_{4 \text{ to } 20}$ alkenyl or $C_{4 \text{ to } 20}$ alkynyl, optionally substituted with one or more substituents independently selected from halo, alkoxy, or haloalkoxy, and
(vi) $-Z-((CF_2)_q(CF_3))_r$, wherein Z is a $C_{1 \text{ to } 12}$ or a $C_{2 \text{ to } 8}$ divalent alkane radical or a $C_{2 \text{ to } 12}$ divalent alkene or alkyne radical, q is an integer from 1 to 12, and r is an integer from 1 to 4;

each X is independently selected from $-H$, $-Cl$, $-I$, $-Br$, $-OH$, $-OR^2$, $-NHR^3$, or $-N(R^3)_2$ group;
each $R^2$ is an independently selected $C_{1 \text{ to } 4}$ alkyl or haloalkyl group; and
each $R^3$ is an independently selected $-H$, $C_{1 \text{ to } 4}$ alkyl, or haloalkyl group.

26. The product according to embodiment 25, wherein each R is selected independently from:
(a) an alkyl or fluoroalkyl group having from 6 to 20 carbon atoms;
(b) an alkyl or fluoroalkyl group having from 8 to 20 carbon atoms;
(c) an alkyl or fluoroalkyl group having from 10 to 20 carbon atoms;
(d) an alkyl or fluoroalkyl group having from 6 to 20 carbon atoms when n is 2 or 3;
(e) an alkyl or fluoroalkyl group having from 8 to 20 carbon atoms when n is 2 or 3; and
(f) an alkyl or fluoroalkyl group having from 10 to 20 carbon atoms when n is 2 or 3.

27. The product according to any of embodiments 25 to 26, wherein R is $-Z-((CF_2)_q(CF_3))_r$, wherein Z is a $C_{1 \text{ to } 12}$ divalent alkane radical or a $C_{2 \text{ to } 12}$ divalent alkene or alkyne radical, q is an integer from 1 to 12, and r is an integer from 1 to 4.

28. The product according to any of embodiments 25 to 27, wherein n is 1, 2, or 3.

29. The product according to any of embodiments 25 to 28, wherein all halogen atoms present in any one or more R groups are fluorine atoms.

30. The product according to any of embodiments 25 to 29, wherein each X is independently selected from $-H$, $-Cl$, $-OR_2$, $-NHR^3$, and $-N(R^3)_2$.

31. The product according to any of embodiments 25 to 30, wherein each X is independently selected from $-Cl$, $-OR_2$, $-NHR^3$, and $-N(R^3)_2$.

32. The product according to any of embodiments 25 to 31, wherein each X is independently selected from $-Cl$, $-NHR^3$, and $-N(R^3)_2$.

33. The product according to any preceding embodiment, wherein two, three, four, or more than four compounds of formula (I) are employed alone or in combination to modify at least one type of second particle and thereby introduce said one or more independently selected hydrophobic or oleophobic moieties; or wherein said second particles incorporated into said second composition have an Oil Repellency Grade Number greater than or equal to about 1, 2, 3, 4, 5, 6, 7, or 8 when measured as a coating applied to a metal plate in the absence of a binder.

34. The product according to any preceding embodiment, wherein said second particles are treated with a silanizing agent selected from the group consisting of: tridecafluoro-1,1,2,2-tetrahydrooctyl)silane; (tridecafluoro-1,1,2,2-tetrahydrooctyl)trichlorosilane; (tridecafluoro-1,1,2,2-tetrahydrooctyl)triethoxysilane; (tridecafluoro-1,1,2,2-tetrahydrooctyl)trimethoxysilane; (heptadecafluoro-1,1,2,2-tetrahydrodecyl)dimethyl(dimethylamino)silane; (heptadecafluoro-1,1,2,2-tetrahydrodecyl)tris(dimethylamino)silane; n-octadecyltrimethoxysilane; n-octyltriethoxysilane; and nonafluorohexyldimethyl(dimethylamino)silane.
35. The product according to any preceding embodiment, wherein said second particles are treated with a silanizing agent selected from the group consisting of dimethyldichlorosilane, hexamethyldisilazane, octyltrimethoxysilane, polydimethylsiloxane, and (tridecafluoro-1,1,2,2-tetrahydrooctyl)trichlorosilane.
36. The product according to any preceding embodiment, wherein said first composition and/or said second composition further comprise a solvent and/or propellant that is selected independently.
37. The product of embodiment 36, wherein said solvent present in said first composition and in said second composition is an independently selected organic solvent or a mixture of two or more organic solvents, and wherein either said organic solvent or said mixture of two or more organic solvents comprises less than 10%, 5%, 2%, 1%, 0.5%, 0.1%, 0.05% or 0.01% of water by weight.
38. The product of embodiment 36 or 37, wherein said solvent or propellant comprises greater than 1%, greater than 2%, greater than 5%, up to 10%, up to 20%, or greater than 20% by weight of any one, two, three or more of each of air, nitrogen, an inert gas, an alkane, a ketone, an ether, a halogenated alkane, a halogenated alkene, an aromatic hydrocarbon, an alcohol, methane, ethane, propane, butane, pentane, hexane, heptane, ethylene, propene, acetone, methyl isobutyl ketone (MIKB), methyl ethyl ketone (MEK), dimethylether (DME), diethyl ether, methyl ethyl ether, methyl tert-butyl ether, chloromethane, dichloromethane, carbon tetrachloride, trichlorofluoromethane, dichlorodifluoromethane, methanol, ethanol, propanol, butanol, benzene, toluene, xylene, 1-chloro-4-(trifluoromethyl)-benzene, carbon disulfide, and isomers of any of the foregoing, based upon the total weight of solvent or propellant present in the composition.
39. The product according to any preceding embodiment, wherein either the first composition and/or second composition further comprises a colorant or pigment.
40. The product according to any preceding embodiment, wherein said binder has an ultimate strength greater than about 20, 21, 22, 23, 24, 26, 28, 30, 32, or 34 Mega Pascals (MPa) (e.g., greater than about 2,500, 2,750, 2,800, 2,900, 3,000, 3,200, 3,500, 3,750, 4,000, 4,250, 4,500, 4,750, or 4,900 psi) measured according to ASTM D412.
41. A method of forming a hydrophobic coating on all or a portion of the surface of an object comprising the steps:
    (a) optionally applying or treating the surface with a primer to form a primed surface,
    (b) forming a base coat by applying a first composition according to any of embodiments 1 to 40 to at least a porting of said surface, or to at least a portion of said primed surface; and
    (c) applying a second composition according to any of embodiments 1 to 40 to all or a portion of the base coat to form said coating,
    wherein said coating has either hydrophobic or superhydrophobic properties, and optionally is also oleophobic, superoleophobic or displays anti-icing properties.
42. The method of embodiment 41, wherein said steps of applying the first composition and applying said second composition are conducted by methods selected independently from painting, printing, stamping, rolling, dipping, spin-coating, spraying, and electrostatic spraying.
43. A coating prepared by the method according to any of embodiments 41 to 42.
44. The coating of embodiment 43, wherein said coating is superhydrophobic and/or superoleophobic.
45. The coating according to embodiment 43 or 44, wherein said coating has an ultimate strength greater than about 20, 21, 22, 23, 24, or 26 mega Pascals (MPa) (e.g., greater than about 2,500, 2,750, 2,800, 2,900, 3,000, 3,200, 3,500, or 3,750 psi) according to ASTM D412 and/or an ultimate elongation of greater than 90%, 100%, 110%, 120%, 140%, 160%, 180%, 200%, 250%, 300%, 350%, 400%, or 420% measured according to ASTM D412.
46. The coating according to any of embodiments 43 to 45, wherein said coating has a modulus at 100% elongation of greater than 10, 11, 12, or 13 mega Pascals (MPa) (e.g., greater than about 1,700, about 1,750, about 1,800, or about 1,850 psi) according to ASTM D412.
47. The coating according to any of embodiments 43 to 46, having an elongation at break of greater than about 100%, 110%, 120%, 140%, 160%, 180%, 200%, 250%, 300%, 350%, 400%, or 420%.
50. The coating according to any of embodiments 43 to 49, wherein said coating is superhydrophobic and retains its superhydrophobicity after being subjected to greater than 20, 25, 30, 40, 50, 60, 70, 80, 90, or 100 cycles on a Taber Abraser using CS-0 or CS-10 wheels and a 250 gram load at 95 rpm at room temperature, wherein the end of superhydrophobicity is determined to be the point when more than half of the water droplets applied to the portion of the surface subject to the action of the wheels do not roll off the surface when the surface is inclined at a 5 degree angle at room temperature.
51. The coating according to embodiment 50, wherein said coating retains its superhydrophobicity after being subjected to greater than 20, 25, 30, 40, 50, 60, 70, 80, 90, or 100 cycles on a Taber Abraser using CS-0 or CS-10 wheels and a 1,000 gram load at 95 rpm at 20° C.-25° C., wherein the end of superhydrophobicity is determined to be the point when more than half of the water droplets applied to the portion of the surface subject to the action of the wheels do not roll off the surface when the surface is inclined at a 5 degree angle at room temperature.
52. The coating according to any of embodiments 43 to 51, wherein said coating is superhydrophobic and when said coating is applied to a substantially planar surface about 10 cm×about 10 cm (4 inches by 4 inches), it continues to display superhydrophobic behavior after being subjected to a continuous shower test of about six liters of water per minute at about 20° C.-25° C. for greater than 0.3, 0.5, 0.6, 1, 2, 3, or 3.5 hours, wherein the duration of superhydrophobic behavior is determined to be the time elapsed until more than half of the water droplets applied to a portion of the surface subject to said shower do not roll off the surface when it is inclined at a 5 degree angle at room temperature,
    wherein the shower test is conducted using a showerhead with 70 nozzles with a 1 mm diameter orifice arranged in 5 spokes of 5 nozzles and 15 spokes of 3 nozzles about a central point on a circular showerhead, and wherein the showerhead delivers approximately 6 liters of potable tap water per minute using about 137,900 Pa (pascals) 310,275 Pa (20-45 psi) within a 60 cm diameter circular area at the level the coating is placed, which is 1.5 meters below the showerhead.
53. The coating of embodiment 52, wherein, when said coating is subjected to said continuous shower test for a period of time sufficient to lose superhydrophobic behavior, the coating regains superhydrophobic behavior following drying at 20° C. to 25° C. and one atmosphere of pressure, said shower testing and drying collectively comprising a single test cycle.
54. The coating of embodiment 53, wherein said coating regains superhydrophobic behavior following more than 5, 10, 15, 20, 30, 40, 50, 75, 100, 150, or 200 of said test cycles.
55. A method according to embodiment 41 or 42, wherein applying according to step (b) is repeated to at least a portion of the coated surface if that portion of the coated surface loses said hydrophobic, superhydrophobic, oleophobic and/or superoleophobic properties, and wherein following the repetition of step (b), the coated portion regains hydrophobic, superhydrophobic, oleophobic and/or superoleophobic properties.
56. A method according to embodiment 41 or 42, wherein both steps (a) and (b) are repeated on at least a portion of the coated surface if that portion of the coated surface loses said hydrophobic, superhydrophobic, oleophobic and/or superoleophobic properties, and wherein following the repetition of steps (a) and (b), the coated portion regains hydrophobic, superhydrophobic, oleophobic and/or superoleophobic properties.
57. A coated surface, or a portion thereof, resulting from the process of embodiment 55 or 56.
58. A product comprising an aerosol spray container (e.g., a metal canister) containing a first composition according to any of embodiments 1 to 40 and a propellant.
59. The product of embodiment 58, wherein the aerosol spray container comprises a valve assembly, a dip tube, and an actuator.
60. A product comprising an aerosol spray container (e.g., a metal canister) containing a second composition according to any of embodiments 1 to 40 and a propellant.
61. The product of embodiment 60, wherein the aerosol spray container comprises a valve assembly, a dip tube, and an actuator.
62. A product comprising an aerosol spray container according to embodiment 58 or 59, and a second aerosol spray container according to embodiment 60 or 61, wherein said second composition optionally expands, softens, or swells the outermost portion of the binder formed by the first composition, even if dried and/or cured so as to permit incorporation of said second particles.
63. The product, method, coating, or coated surface of any of embodiments 1-62, wherein the second particles are present as aggregates or agglomerates that range from about 0.3 µm to about 150 µm, about 0.3 µm (microns) to about 3 µm, about 1.0 µm to about 10 µm, about 5 µm to about 20 µm, about 10 µm to about 30 µm, about 20 µm to about 50 µm, about 30 µm to about 100 µm, about 50 µm to about 100 µm, about 75 µm to about 125 µm, or about 100 µm to about 150 µm (MN value as measured by laser diffraction).

9.0 Examples

Example 1

A first composition is prepared by mixing 207 units (by weight) of Desmodur N-100, which is a homopolymer of hexamethylene diisocyante (HDI), with 500 units (by weight) of Desmophen 670 BA, which is slightly branched hydroxyl-bearing polyester with a functionality slightly greater than 2. Where desired, 20 to 70 µm first particles (g/liter) are compounded into the unreacted mixture. This mixture is then typically diluted with a mixture of t-butyl acetate and methyl acetate to reduce the viscosity for spray application. That solvent combination is aprotic and, as such, is appropriate for urethane systems; both solvents are also VOC exempt per the US EPA and the California SCAQMD (South Coast Air Quality Management District).

A second composition is formed by combining 1.6 g/l of second particles with a suitable solvent (e.g., acetone or hexane) and optionally a 0.6 g/l of a fluoropolymer forming composition, such as a fluoroethyl vinylether (fluoroethyl vinylether or FEVE, e.g., LUMIFLON LF-200). Where a FEVE is employed, ketone containing solvents, such as acetone, MEK, or MIKB, tend to perform better as they are generally more effective at dissolving the FEVE forming components.

The first composition is applied to an aluminum sheet by spraying at a rate of about 45 g/ft$^2$ to about 135 g/ft$^2$. Once excess solvent has evaporated from the first composition the second composition is applied at a rate of about 45 g/ft$^2$ to about 135 g/ft$^2$. Spraying at those rates ultimately produces a dried and cured flexible HP/OP polyurethane coating of about 10 to about 37 microns thick. The polyurethane coatings formed can be flexed more than 90 degrees without crazing or cracking.

Physical Properties for Example 1

| Test | Taber 1000 g CS-10 wheel | Crockmeter Cycles | Glove Rubs | Roughness (microns) |
| --- | --- | --- | --- | --- |
| Result | 20 | 40 | 250 | 10.0 |

The invention claimed is:
1. A system for forming a hydrophobic coating comprising a first composition and a second composition:
   wherein the first composition, which is uncured, comprises
   i) one or more polyisocyanates and one or more polyester polyalcohols that react to form a polyurethane, wherein said one or more polyalcohols each have a molecular weight from about 150 to about 10,000 Daltons and an average molar hydroxyl functionality from about 2.0 to about 2.5,
   ii) about 2% to about 20% by weight of one or more independently selected first particles having a size of about 30 µm to about 225 µm, and
   iii) one or more independently selected solvents; and
   wherein the second composition, which is uncured, comprises
   i) one or more independently selected second particles having a size of about 1 nm to about 25 µm, wherein said second particles comprise one or more independently selected hydrophobic and/or oleophobic moieties bound, either directly or indirectly, to said second particles, and
   ii) one or more independently selected solvents, wherein said second particles are present in a weight percent range selected from 0.1-5.0, based on the weight of the one or more solvents and second particles;
   wherein the first and second coating compositions are separately packaged.

2. A system for forming a hydrophobic coating comprising a first composition and a second composition:
wherein the first composition, which is uncured, comprises
i) one or more polyisocyanates and one or more polyester polyalcohols that react to form a polyurethane, wherein said one or more polyalcohols have a molecular weight from about 150 to about 10,000 Daltons and an average molar hydroxyl functionality from about 2.0 to about 2.5,
ii) about 2% to about 20% by weight of one or more independently selected first particles having a size of about 30 μm to about 225 μm, and
iii) the first composition optionally comprising one or more independently selected solvents; and
wherein the second composition, which is uncured, comprises per 100 parts by weight of
i) 0.1 to 3.5 parts by weight of one or more independently selected second particles having a size of about 1 nm to about 25 μm, wherein said second particles comprise one or more independently selected hydrophobic or oleophobic moieties bound, either directly or indirectly, to said second particles, or one or more siloxanes or silazanes associated with said second particles,
ii) 0.1 to 1.0 parts by weight of a fluorinated polyolefin; and/or
0.06 to 0.6 parts by weight of a fluoroethylene-alkyl vinyl ether (FEVE) copolymer, having an average molecular weight of about 1,000 to about 3,000 Daltons, and
iii) one or more independently selected solvents for the remainder of a total of 100 parts by weight;
wherein the first and second coating compositions are separately packaged.

3. The system of claim 2, wherein said one or more polyester polyalcohols comprise one or more hydroxyl bearing polyether, polyamide, and/or polyacrylate polymers.

4. The system of claim 2, comprising a single type of polyester polyalcohol that comprises 0, 1, 2, or 3 terminal hydroxyl groups per molecule, or a mixture of two or more polyester polyalcohols that comprise 0-1, 1-2, or 2-3 terminal hydroxyl functionalities.

5. The system of claim 3, wherein said polyalcohol comprises monomers with a molecular weight in a range selected from 60-150 g/mole.

6. The system of claim 2, wherein the second composition comprises a FEVE.

7. The system of claim 2, wherein the one or more polyester polyalcohols have no terminal hydroxyl groups.

8. A method of forming a hydrophobic coating on all or a portion of the surface of an object comprising the steps:
(a) optionally applying or treating the surface with a primer to form a primed surface,
(b) forming a base coat by applying an uncured first composition comprising
i) one or more polyisocyanates and one or more polyester polyalcohols that react to form a polyurethane, wherein said one or more polyalcohols have a molecular weight from about 150 to about 10,000 Daltons and an average molar hydroxyl functionality from about 2.0 to about 2.5,
ii) about 2% to about 20% by weight of one or more independently selected first particles having a size of about 30 μm to about 225 μm, and
iii) the first composition optionally comprising one or more independently selected solvents
to at least a portion of said surface, or to at least a portion of said primed surface; and
(c) applying an uncured second composition comprising
i) 0.1 to 3.5 parts by weight of one or more independently selected second particles having a size of about 1 nm to about 25 μm, wherein said second particles comprise one or more independently selected hydrophobic or oleophobic moieties bound, either directly or indirectly, to said second particles, or one or more siloxanes or silazanes associated with said second particles,
ii) 0.1 to 1.0 parts by weight of a fluorinated polyolefin; and/or
0.06 to 0.6 parts by weight of a fluoroethylene-alkyl vinyl ether (FEVE) copolymer, having an average molecular weight of about 1,000 to about 3,000 Daltons, and
iii) one or more independently selected solvents for the remainder of a total of 100 parts by weight
to all or a portion of the base coat to form said coating, wherein said coating has either hydrophobic or superhydrophobic properties, and optionally is also oleophobic or superoleophobic.

9. The method of claim 8, wherein said steps of applying said first composition and applying said second composition are conducted by methods selected independently from painting, printing, stamping, rolling, dipping, spin coating, spraying, and electrostatic spraying.

10. A coating prepared by the method according to claim 8.

11. The coating of claim 10, wherein said coating is superhydrophobic and/or superoleophobic.

12. The coating according to claim 11, wherein said coating has an ultimate strength greater than about 20 mega Pascals (MPa) according to ASTM D412 and/or an ultimate elongation of greater than 90%, measured according to ASTM D412.

13. The coating according to claim 10, wherein said coating has a modulus at 100% elongation of greater than 10, 11, 12, or 13 mega Pascals (MPa) according to ASTM D412.

14. The coating according to claim 10, having an elongation at break of greater than about 100%.

15. The coating according to claim 10, wherein said coating is superhydrophobic and retains its superhydrophobicity after being subjected to greater than 30 cycles on a Taber Abraser using CS-0 or CS-10 wheels and a 250 gram load at 95 rpm at room temperature, wherein the end of superhydrophobicity is determined to be the point when more than half of the water droplets applied to the portion of the surface subject to the action of the wheels do not roll off the surface when the surface is inclined at a 5 degree angle at room temperature.

16. The coating according to claim 15, wherein said coating retains its superhydrophobicity after being subjected to greater than 20 cycles on a Taber Abraser using CS-0 or CS-10 wheels and a 1,000 gram load at 95 rpm at 20° C. - 25° C., wherein the end of superhydrophobicity is determined to be the point when more than half of the water droplets applied to the portion of the surface subject to the action of the wheels do not roll off the surface when the surface is inclined at a 5 degree angle at room temperature.

17. The coating according to claim 10, wherein said coating is superhydrophobic and when said coating is applied to a substantially planar surface about 10 cm × about 10 cm, it continues to display superhydrophobic behavior after being subjected to a continuous shower test of about six liters of water per minute at about 20° C. to 25° C. for greater than 0.5 hours.

18. The coating of claim 17, wherein, when said coating is subjected to said continuous shower test for a period of time sufficient to lose superhydrophobic behavior, the coating regains superhydrophobic behavior following drying at 20° C. to 25° C. and one atmosphere of pressure, said shower testing and drying collectively comprising a single test cycle, and wherein said coating regains superhydrophobic behavior following more than 200 test cycles.

19. A product comprising:
   a first aerosol spray container containing an uncured first composition comprising:
      i) one or more polyisocyanates and one or more polyester polyalcohols that react to form a polyurethane, wherein said one or more polyalcohols have a molecular weight from about 150 to about 10,000 Daltons and an average molar hydroxyl functionality from about 2.0 to about 2.5,
      ii) about 2% to about 20% by weight of one or more independently selected first particles having a size of about 30 μm to about 225 μm,
      iii) the first composition optionally comprising one or more independently selected solvents, and
      iv) a propellant,
   wherein the first aerosol spray container comprises a valve assembly, a dip tube, and an actuator; and
   a second aerosol spray container containing an uncured second composition comprising
      i) 0.1 to 3.5 parts by weight of one or more independently selected second particles having a size of about 1 nm to about 25 μm, wherein said second particles comprise one or more independently selected hydrophobic or oleophobic moieties bound, either directly or indirectly, to said second particles, or one or more siloxanes or silazanes associated with said second particles,
      ii) 0.1 to 1.0 parts by weight of a fluorinated polyolefin; and/or
         0.06 to 0.6 parts by weight of a fluoroethylene-alkyl vinyl ether (FEVE) copolymer, having an average molecular weight of about 1,000 to about 3,000 Daltons,
      iii) one or more independently selected solvents for the remainder of a total of 100 parts by weight; and
      iv) a propellant,
   wherein the second aerosol spray container comprises a valve assembly, a dip tube, and an actuator.

20. A system for forming a coating comprising:
   a first composition, which is uncured, and a second composition, which is uncured;
   wherein the first composition comprises
      i) one or more polyisocyanates and one or more polyamides, and/or polyacrylate polyalcohol polymers that react to form a polyurethane, wherein said one or more polyalcohol polymers have a molecular weight from about 150 to about 10,000 Daltons and an average molar hydroxyl functionality from about 2.0 to about 2.5,
      ii) the first composition optionally comprising one or more independently selected first particles having a size of about 30 μm to about 225 μm, wherein, when said first particles are present, the first composition comprises from about 5% to about 20% of said first particles by weight, and
      iii) the first composition optionally comprising one or more independently selected solvents; and
   wherein the second composition comprises per 100 parts by weight
      i) 0.1 to 3.5 parts by weight of one or more independently selected second particles having a size of about 1 nm to about 25 μm, wherein said second particles comprise one or more independently selected hydrophobic or oleophobic moieties bound, either directly or indirectly, to said second particles, or one or more siloxanes or silazanes associated with said second particles,
      ii) 0.1 to 1.0 parts by weight of a fluorinated polyolefin; and/or
         0.06 to 0.6 parts by weight of a fluoroethylene-alkyl vinyl ether (FEVE) copolymer, having an average molecular weight of about 1,000 to about 3,000 Daltons, and
      iii) the second composition comprising one or more independently selected solvents for the remainder of a total of 100 parts by weight.

21. The system of claim 20, wherein the second composition comprises a FEVE.

* * * * *